United States Patent
Batra et al.

(10) Patent No.: US 7,634,020 B2
(45) Date of Patent: Dec. 15, 2009

(54) PREAMBLE FOR A TFI-OFDM COMMUNICATIONS SYSTEM

(75) Inventors: Anuj Batra, Dallas, TX (US); Jaiganesh Balakrishnan, Karnataka (IN); Anand Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 861 days.

(21) Appl. No.: 10/782,095

(22) Filed: Feb. 19, 2004

(65) Prior Publication Data

US 2004/0179507 A1  Sep. 16, 2004

Related U.S. Application Data

(60) Provisional application No. 60/453,875, filed on Mar. 11, 2003, provisional application No. 60/477,186, filed on Jun. 10, 2003, provisional application No. 60/502,414, filed on Sep. 12, 2003.

(51) Int. Cl.
*H04L 27/00* (2006.01)

(52) U.S. Cl. .................................................. 375/295

(58) Field of Classification Search ................. 375/130, 375/131, 135, 146, 295, 240.18; 370/210; 379/406.13; 708/404, 405; 342/196; 340/3.21
See application file for complete search history.

(56) References Cited

U.S. PATENT DOCUMENTS 7,054,296 B1 * 5/2006 Sorrells et al. .............. 370/338

| | | | |
|---|---|---|---|
| 2002/0032001 A1 * | 3/2002 | Fischer et al. | 455/3.01 |
| 2002/0041635 A1 * | 4/2002 | Ma et al. | 375/267 |
| 2003/0007190 A1 * | 1/2003 | Kaku et al. | 358/426.09 |
| 2004/0022174 A1 * | 2/2004 | Li et al. | 370/203 |

OTHER PUBLICATIONS

Kohno, R., et al., "Project: IEEE P802.15 Working Group for Wireless Personal Area Networks (WPANs)", doc.: IEEE 802.15-03/097r1, IEEE P802.15 Alternative PHY Call For Proposals, IEEE P802.15-021327r7, Japan, Mar. 2003.

* cited by examiner

*Primary Examiner*—Sam K Ahn
(74) *Attorney, Agent, or Firm*—Ronald O. Neerings; Wade James Brady, III; Frederick J. Telecky, Jr.

(57) ABSTRACT

System and method for simplifying preamble detection and reducing power consumption in receivers. A preferred embodiment comprises a preamble made up of two sequences, a first sequence that is specified in the time domain and a second sequence that is specified in the frequency domain. The first sequence which comprises multiple copies of a time domain code sequence can allow easy detection of the preamble while the second sequence comprises multiple copies of a frequency domain code sequence and allows easy determination of the frequency response of the communications channel. A hierarchical sequence can be used to allow multi-stage correlation. This can result in a less complex correlator, hence lower power consumption. Piconets can use different code sequences to allow rapid determination of the source of a transmission without requiring the receiver to decode the entire transmission.

36 Claims, 7 Drawing Sheets

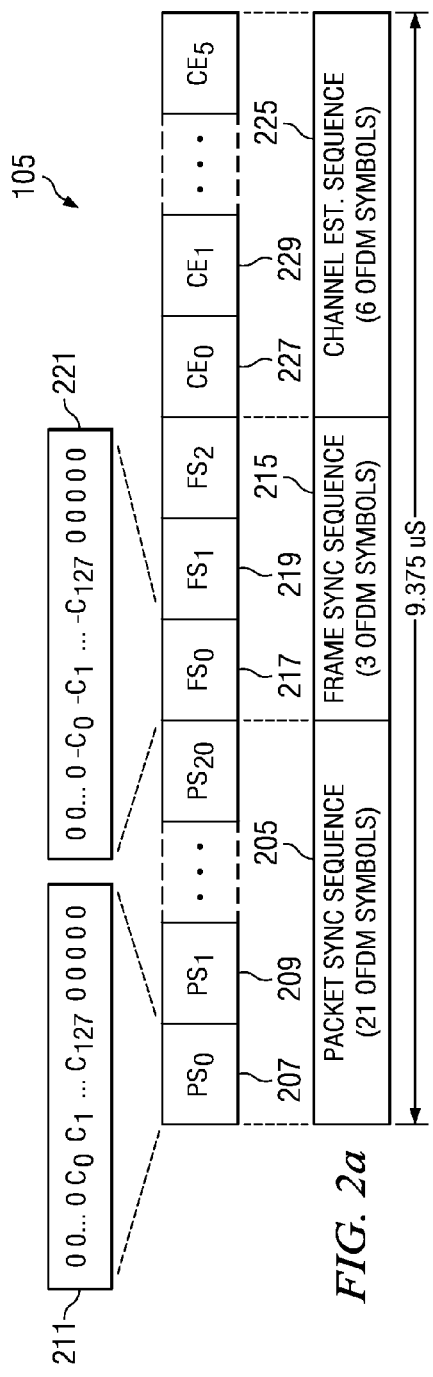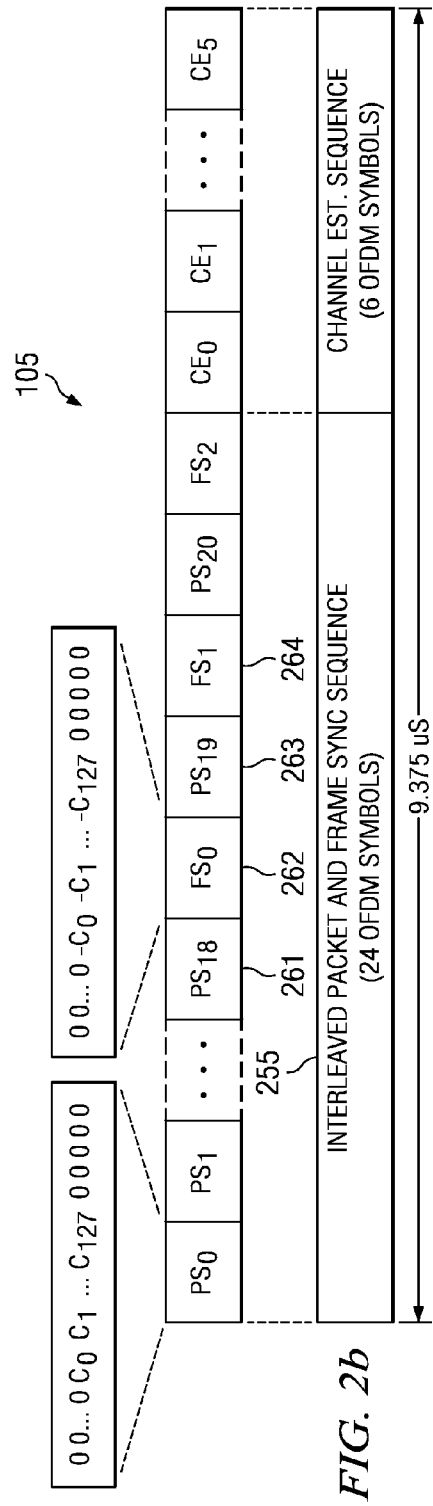

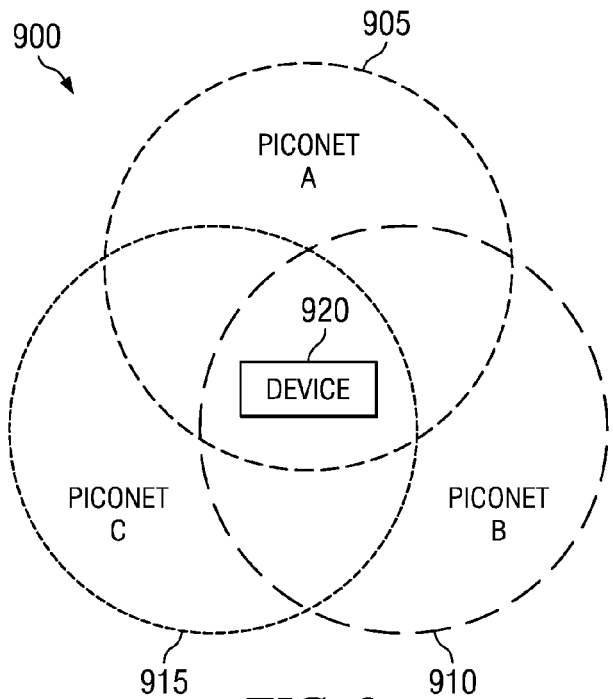
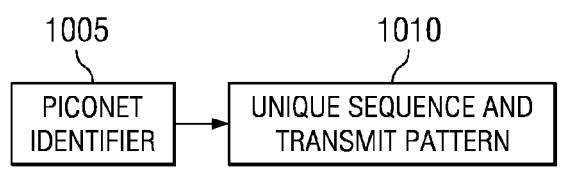
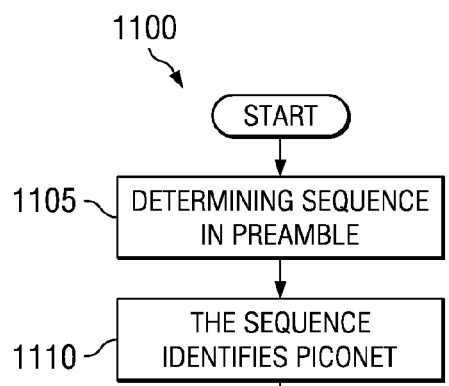

PREAMBLE FOR A TFI-OFDM COMMUNICATIONS SYSTEM

This application claims the benefit of U.S. Provisional Applications: No. 60/453,875, filed Mar. 11, 2003, entitled "Hierarchical Preamble for a TFI-OFDM System;" No. 60/477,186, filed Jun. 10, 2003, entitled "Use of Different Hierarchical Preambles to Distinguish Between Multiple Piconets;" and No. 60/502,414, filed Sep. 12, 2003, entitled "Four Hierarchical Preambles to Distinguish Between Multiple Piconets" which applications are hereby incorporated herein by reference.

CROSS-REFERENCE TO RELATED APPLICATIONS

This application is related to the following co-pending and commonly assigned patent applications: Ser. No. 10/688,169, filed Oct. 18, 2003, entitled "Time-Frequency Interleaved Orthogonal Frequency Division Multiplexing Ultra Wide Band Physical Layer," which application is incorporated by reference; patent application entitled "Multi-Channel Option for TFI-OFDM", U.S. application Ser. No. 10/844,832; patent application entitled "Low Data Rate/Low Power TFI-OFDM UWB Devices," U.S. application Ser. No. 10/858,273.

TECHNICAL FIELD

The present invention relates generally to a system and method for digital communications, and more particularly to a system and method for simplifying preamble detection and reducing power consumption in receivers.

BACKGROUND

In a typical wireless communications system, in order to reduce power consumption, a receiver periodically wakes up from a sleep state to determine if there is a transmission for which it is the intended receiver. If there is not, then the receiver can go back to sleep. Since the amount of power consumed while the receiver is in the sleep state can be much less than when the receiver is operating in a normal mode and the amount of time the receiver spends determining if there is an incoming transmission is short, the average power consumption can be quite low. The low power consumption may lead to extended periods between recharging (or replacing) the batteries used in the receiver.

However, while the receiver is on for the determination if there is an incoming transmission, a comparatively large amount of power may still be consumed. Therefore, it can be desirable to reduce the amount of time that the receiver is active. One technique that can be used to reduce the amount of on-time for the receiver is to use a short preamble. The short preamble reduces the amount of time that is required to receive the transmission, therefore reducing the on-time. Another technique that can be used involves the use of a specific and easy-to-detect preamble.

One disadvantage of the prior art is that by shortening the preamble, the amount of time that the transmission is on the air is shortened. By shortening the air-time, it may be easier for a receiver to miss the transmission, which can lead to the receiver missing an incoming call or message.

A second disadvantage of the prior art is that by shortening the preamble, existing advantages of a particular wireless communications technique may not be fully exploited, such as making full use of available bandwidth, exploiting the frequency diversity available in a communications channel, complying to technical and regulatory requirements, operating in the presence of interferers, and so forth.

SUMMARY OF THE INVENTION

These and other problems are generally solved or circumvented, and technical advantages are generally achieved, by preferred embodiments of the present invention which provides for a system and method for simplifying preamble detection and reducing power consumption in receivers of wireless communications systems.

In accordance with a preferred embodiment of the present invention, a preamble for a wireless communications system, the preamble comprising a sequence wherein the sequence comprises a concatenation of a first set of sub-sequences, with each sub-sequence containing a specified number of zeroes, and wherein each sub-sequence can differ depending upon its position in the preamble is provided.

In accordance with another preferred embodiment of the present invention, a method for distinguishing multiple piconets, wherein each piconet transmits a preamble with a unique code sequence, the method comprising determining the code sequence in the preamble, and identifying the piconet based on the code sequence, wherein the code sequence maps onto a unique piconet identifier is provided.

In accordance with another preferred embodiment of the present invention, a circuit to despread a hierarchical sequence made by spreading an M-length sequence with an N-length sequence, the circuit comprising a first despreader coupled to a signal input, the first despreader to despread a received signal provided by the signal input with a first sequence and a second despreader coupled to an output of the first despreader, the second despreader to despread the output of the first despreader with a second sequence is provided.

An advantage of a preferred embodiment of the present invention is that the amount of power consumed by a receiver when the receiver is determining if there is an incoming transmission can be significantly reduced. This can reduce the average power consumption for the receiver, therefore possibly extending the battery life of the receiver.

A further advantage of a preferred embodiment of the present invention is that performance specifications for circuitry in portions of the receiver can be relaxed. Therefore, lower performing (and hence lower cost) circuitry can be used and the overall cost of the receiver can be reduced.

Yet another advantage of a preferred embodiment of the present invention is that preamble detection may be more robust. This can allow for more electronic devices to operate in close proximity and/or at a higher data rate.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2*a* and 2*b* are diagrams of detailed views of preambles that can be used in the PLCP frame, according to a preferred embodiment of the present invention;

FIG. 9 is a diagram of a coverage area map of several piconets, according to a preferred embodiment of the present invention;

FIG. 10 is a diagram of a mapping of a piconet identifier to a unique sequence, according to a preferred embodiment of the present invention; and FIG. 11 is a diagram of an algorithm for use in distinguishing transmissions from multiple piconets, according to a preferred embodiment of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a time-frequency interleaved, orthogonal frequency division multiplexed (TFI-OFDM) wireless communications system, such as one that is adherent to IEEE 802.15.3a technical specifications. The IEEE 802.15.3a technical requirements can be found in a document entitled "TG3a Technical Requirements," published Dec. 27, 2002, which is herein incorporated by reference. The invention may also be applied, however, to any wireless communications system that places its receivers into a sleep state and then periodically wakes them up to determine if there is an incoming transmission in order to reduce power consumption.

Figure 1:
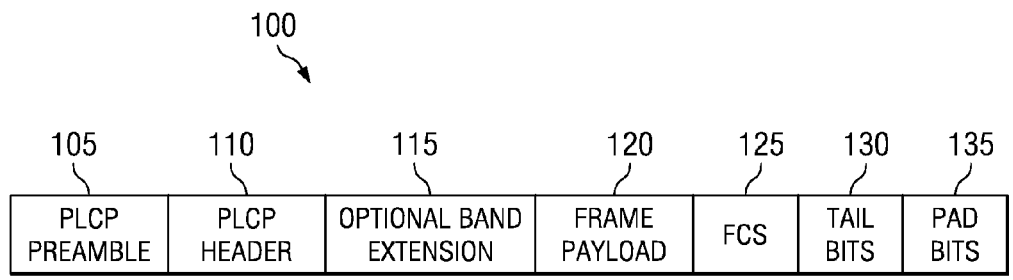
FIG. 1 is a diagram of a physical layer convergence procedure (PLCP) frame that can be used in a wireless communications system.

With reference now to FIG. 1, there is shown a diagram illustrating a physical layer convergence procedure (PLCP) frame 100 that can be used in a wireless communications system. The PLCP frame 100 can be made up of a PLCP preamble 105, a PLCP header 110 (which can include a physical layer header, a media access control layer header, a header check sequence, tail bits, and check bits), an optional extension sequence 115, a frame payload 120, a frame check sequence (FCS) 125, tail bits 130, and pad bits 135. The optional extension sequence 115 may carry additional information that can be used in the estimation of additional channels, beyond what is provided for in a transmission header. The frame payload 120 can be used to carry the data (if any) to be transmitted, while the FCS 120 can be used to protect the contents of the frame payload 120. The tail bits 130 may be used to return a convolutional encoder to a zero state, while the pad bits 135 can be used to align the transmission along symbol boundaries. The PLCP preamble 105 can be used to aid receivers in synchronizing, carrier-offset recovery, and channel estimation. A detailed discussion of the PLCP preamble 105 is presented below.

With reference now to FIG. 2*a*, there is shown a diagram illustrating a detailed view of the PLCP preamble 105, according to a preferred embodiment of the present invention. According to a preferred embodiment of the present invention, the PLCP preamble 105 can be transmitted prior to the PLCP header 110 to aid the receiver in performing tasks such as synchronization, carrier-offset recovery, and channel estimation. Note that in some communications, a preamble may actually be located in the middle of a transmission (in this case, it is referred to as a midamble) or at the end of a transmission (in this case, it is referred to as a postamble). However, in a majority of communications systems, especially asynchronous systems, the preamble is located at the beginning of a transmission.

As shown in FIG. 2*a*, the PLCP preamble 105 is for a communications system operating in a normal mode. The PLCP preamble 105 can be made up of three distinct sequences: a packet synchronization sequence 205, a frame synchronization sequence 215, and a channel estimation sequence 225. According to a preferred embodiment of the present invention, the packet synchronization sequence 205 can be used for packet detection and acquisition, coarse frequency estimation, and coarse symbol timing. The packet synchronization sequence 205 can be constructed from multiple periods, such as periods $PS_0$ 207 and $PS_1$ 209, of a time domain sequence (preferably 21 periods). The frame synchronization sequence 215 can be used to synchronize the receiver. The frame synchronization sequence 215 can be constructed from multiple periods, such as periods $FS_0$ 217 and $FS_1$ 219, of a time domain sequence (preferably three (3) periods). The channel estimation sequence 225 can be used to estimate the frequency response of the communications channel, for fine carrier frequency estimation, and fine symbol timing. The channel estimation sequence 225 can be constructed from multiple periods, such as periods $CE_0$ 227 and $CE_1$ 229, of an OFDM training symbol (preferably six (6) periods). Note that the number of periods for each sequence (21, 3, and 6) may have been chosen due to performance, regulatory, and technical constraints and that the selection of other values may result in an equally operable communications system. Therefore, the specific lengths of the sequences should not be construed as limiting the spirit of the present invention.

Note that it is preferred that the packet synchronization sequence 205 and the frame synchronization sequence 215 be created from time domain sequences while the channel estimation sequence 225 be created from a frequency domain symbol. According to a preferred embodiment of the present invention, a period of the packet synchronization sequence 205, for example, period $PS_0$ 207, can be created from a 128-length sequence that is zero-padded by 32 samples (the 32 zero samples can be prepended to the 128-length sequence) and then a guard interval may be appended to the 160-length sequence (shown as sequence 211). The zero-padded sequence is displayed in the sequence 211 as "0 0 . . . 0", while the 128-length sequence is represented as "$C_1$ $C_2$ . . . $C_{127}$" and the guard interval is represented as "0 0 0 0 0." Note that rather than being zero-padded by 32 samples, the 128-length sequence may have a 32-sample cyclic prefix that is prepended to the 128-length sequence. The guard interval can be used to ensure that the transmitter and receiver have adequate time to switch from a current channel to a subsequent channel. The guard interval may be made from a sequence of five zero samples. Note that other values may be used in place of the zero samples, such as one samples or five samples from the 128-length sequence. Refer to the tables at the end of the specification (just before the claims), illustrating exemplary 128-length sequences that can be used in the creation of a packet synchronization sequence, such as Tables 1 through 4 and 7 through 10.

A period of the frame synchronization sequence 215, for example, period $FS_0$ 217, can also be created from a 128-length sequence that has been zero-padded by 32 samples with a five sample guard interval of zero values (shown as sequence 221). As discussed above, a 32 sample cyclic prefix may be prepended to the 128-length sequence in place of the zero-padding. Once again, other values may be used in the guard band, such as one values or actual values from the 128-length sequence. According to a preferred embodiment of the present invention, the 128-length sequence used to create the frame synchronization sequence 215 may be a 180-degree rotated version of the 128-length sequence used to create the packet synchronization sequence 205. A 180-degree rotation of the 128-length sequence may also be thought of as inverting the phase of the 128-length sequence. Once again, the particular values used in the generation of the sequences (such as the 128-length sequence, the 32 sample cyclic extension, and the five sample guard band) may have been chosen based on performance, regulatory, and technical specifications and can change without changing the spirit of the present invention.

While the packet synchronization sequence 205 and the frame synchronization sequence 215 may be created from time domain sequences, the channel estimation sequence 225 can be created from a frequency domain sequence. Refer to tables 11 and 12 for exemplary 128-length sequences that can be used in the creation of a channel estimation sequence. The use of a frequency domain sequence in place of a time domain sequence can permit the exploitation of the frequency diversity of the communications channel since the frequency domain sequence can be specified to take full use of the available frequency bandwidth. Additionally, by specifying the channel estimation sequence in the frequency domain, any regulatory restrictions can be readily met by simply changing the specifications of the frequency domain sequence. For example, if a portion of the frequency band of the communications channel needs to eliminated, perhaps due to a governmental restriction or the presence of an interferer, the frequency domain sequence can be modified to compensate for the particular portion. Similar changes to a time domain sequence may require significant work. Note that for both time domain and frequency domain sequences, a value commonly referred to as a peak-to-average ratio (PAR) is of concern. A large PAR value can have a detrimental effect upon the resolution of digital-to-analog and analog-to-digital converters. Therefore, the time domain and frequency domain sequences should be selected with minimum PAR in mind.

Once the frequency domain sequence is defined, it may be converted into a time domain sequence via the use of an inverse Fourier transform. It may be preferred that an inverse Fast Fourier transform (IFFT) be used, but other inverse Fourier transforms may also be used. Note that if the frequency domain sequence is conjugate symmetric, then the output of the inverse Fourier transform is real-valued. After the conversion, a zero-padded prefix and a guard band may be appended to the time domain sequence. According to a preferred embodiment of the present invention, the time domain sequence is a 128-length sequence, while the zero-padding may be 32 samples long and the guard band can be a five sample sequence of zero values. Alternatively, rather than the 32 sample zero-padding, a cyclic prefix that is 32 samples in length may be used. Once again, other values may be used in the guard band, such as one values or actual values from the 128-length sequence.

With reference now to FIG. 2b, there is shown a diagram illustrating a detailed view of the PLCP preamble 105, wherein the PLCP preamble can be used in a communications system using transmit frequency interleaving (TFI), according to a preferred embodiment of the present invention. In a communications system that is using TFI, a transmit pattern may be used to specify the frequency channels used, for example, a transmit pattern of [1 1 2 2 3 3] implies that frequency channel #1 is to be used to transmit-the-first two periods and then frequency channel #2 is used for the next two periods and frequency channel #3 is used for the fifth and sixth periods, with the pattern repeating. The term interleaving sequence may sometimes be used interchangeably with transmit pattern. Note that many different transmit patterns may be possible. Refer to a co-pending and co-assigned patent application entitled "Interleaving Sequences for Multiple Access," U.S. application Ser. No. 10/844,832 for a detailed discussion of different interleaving patterns.

In order to support boundary detection (for example, between the packet synchronization sequence 205 (FIG. 2a) and the frame synchronization sequence 210 (FIG. 2a)), the final periods of a packet synchronization sequence should be followed by the first periods of a frame synchronization sequence, with both periods appearing upon the same frequency channel. With the standard PLCP preamble 105 (as shown in FIG. 2a) and certain transmit patterns, such as [1 1 2 2 3 3], the periods of the frame synchronization sequence 215 do not appear in all three frequency channels. With the transmit pattern [1 1 2 2 3 3], the periods of the frame synchronization sequence 215 are transmitted on frequency channels 2 and 3, with two periods transmitted on frequency channel 3. One way to ensure that this occurs is to interleave the packet synchronization sequence 205 with the frame synchronization sequence 210. Rather than having disjoint packet and frame synchronization sequences as displayed in FIG. 2a, the PLCP preamble 105 displayed in FIG. 2b has an interleaved packet and frame synchronization sequence 255. Since the packet synchronization sequence may be significantly longer than the frame synchronization sequence, the frame synchronization sequence periods may be interleaved with the final few periods of the packet synchronization sequence. For example, period $PS_{18}$ 261 may be followed with period $FS_0$ 262 and period $PS_{19}$ 263 may be followed with period $FS_1$ 264.

The PLCP preamble 105 displayed in FIG. 2b, when used with certain transmit patterns, such as, [1 1 2 2 3 3] and [1 1 3 3 2 2], can permit a packet synchronization period ($PS_{18}$ 261) to be immediately followed by a frame synchronization period ($FS_0$ 262) on the same frequency channel. Note that other transmit patterns, such as [1 2 3 1 2 3] and [1 3 2 1 3 2] may perform better with the disjoint PLCP preamble 105 shown in FIG. 2a, since with the interleaved PLCP preamble, the periods of the frame synchronization sequence may not be present in each frequency channel. Therefore, depending upon the transmit pattern, the optimal PLCP preamble can be different. In fact, the PLCP preamble used may differ depending upon the transmit pattern. For example, if a piconet uses a certain transmit pattern, then it may elect to use a certain PLCP preamble (either disjoint or interleaved) to improve performance.

Figure 3A:
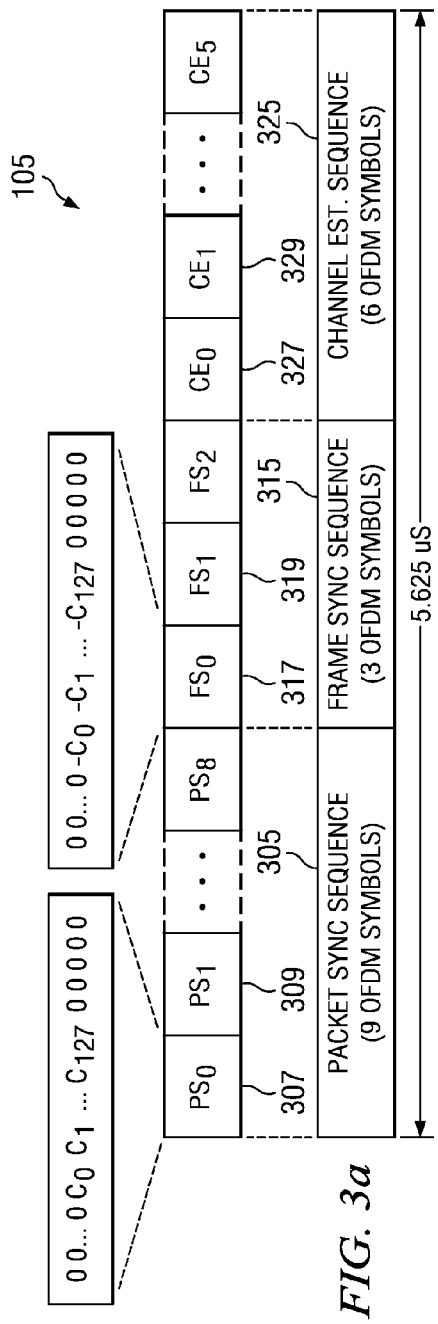
FIGS. 3*a* and 3*b* are diagrams of detailed views of preambles that can be used in the PLCP frame, wherein the PLCP frame is for a communications system operating in a streaming mode, according to a preferred embodiment of the present invention.

With reference now to FIG. 3a, there is shown a diagram illustrating a detailed view of the PLCP preamble 105, wherein the PLCP preamble 105 is for a communications system operating in a streaming mode, according to a preferred embodiment of the present invention. When operating in streaming mode, an initial packet can use a preamble that is identical to a normal mode PLCP preamble (FIG. 2a), while subsequent packets can use a different preamble. The streaming mode PLCP preamble 105 can be made up of three distinct sequences: a packet synchronization sequence 305, a frame synchronization sequence 315, and a channel estimation sequence 325. The three sequences in the streaming mode PLCP preamble 105 (the packet synchronization sequence 305, the frame synchronization sequence 315, and the channel estimation sequence 325) may be used for the same purposes as in a normal mode PLCP preamble. However, according to a preferred embodiment of the present invention, the packet synchronization sequence 305 can be made up of nine (9) periods, such as periods $PS_0$ 307 and $PS_1$ 309, of a time domain sequence. Note that the time domain sequence may be identical to the time domain sequence used in a normal mode PLCP preamble. The frame synchronization sequence 315 can be made up of three periods, such as periods $FS_0$ 317 and $FS_1$ 319, of a time domain sequence. The channel estimation sequence 325 can be created from six (6) periods, such as periods $CE_0$ 327 and $CE_1$ 329, of a frequency domain sequence. Refer to the tables at the end of the specification, illustrating exemplary 128-length sequences that can be used in the creation of packet synchronization, frame synchronization, and channel estimation sequences.

Figure 3B:
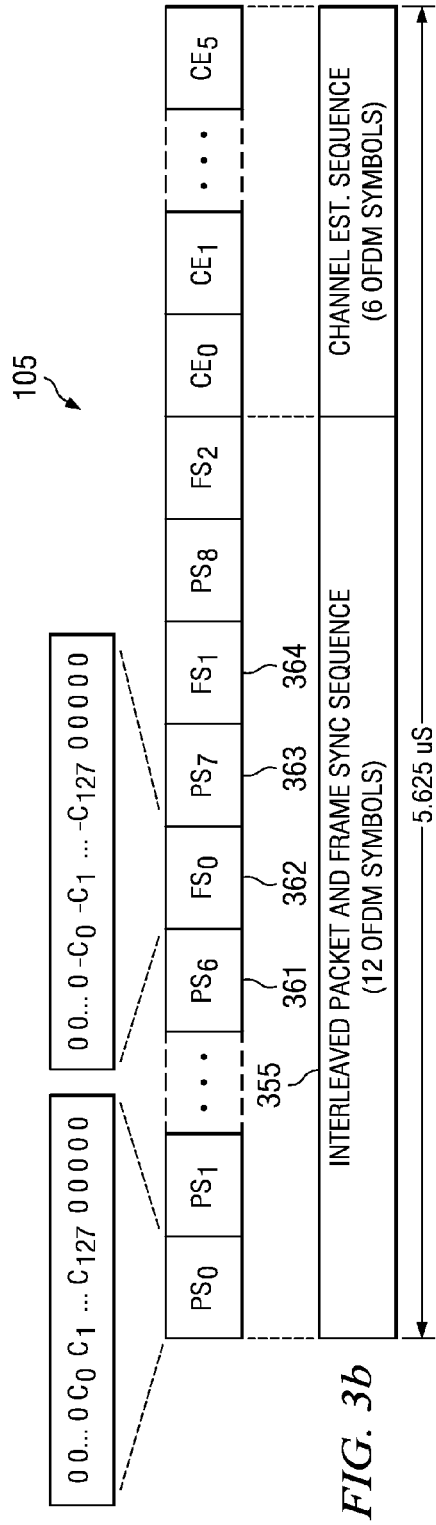

With reference now to FIG. 3b, there is shown a diagram illustrating a detailed view of the PLCP preamble 105, wherein the PLCP preamble 105 is for a communications system operating in a streaming mode and features transmit frequency interleaving (TFI), according to a preferred embodiment of the present invention. As discussed above, when the communications system uses TFI, it may be necessary to interleave the PLCP preamble 105. If the communications system uses a transmit pattern of [1 1 2 2 3 3], for example, then the PLCP preamble 105 may be scrambled as illustrated in FIG. 3b. The PLCP preamble 105 has an interleaved packet and frame synchronization sequence 355 that can be 12 OFDM symbols in length. The OFDM symbols in the interleaved packet and frame synchronization sequence 355 may be made up of additional packet synchronization sequence periods, such as period $PS_6$ 361 and $PS_7$ 363. Periods of the frame synchronization sequence, such as period $FS_0$ 362 and $FS_1$ 364 can be interleaved between these additional packet synchronization sequence periods.

Figure 4A:
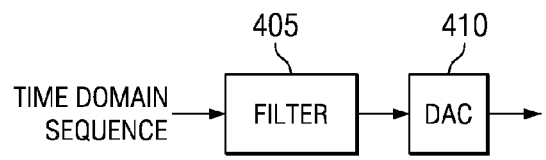
FIGS. 4*a* and 4*b* are diagrams of additional processing and manipulating that a time domain sequence may undergo prior to transmission, according to a preferred embodiment of the present invention.
Figure 4B:
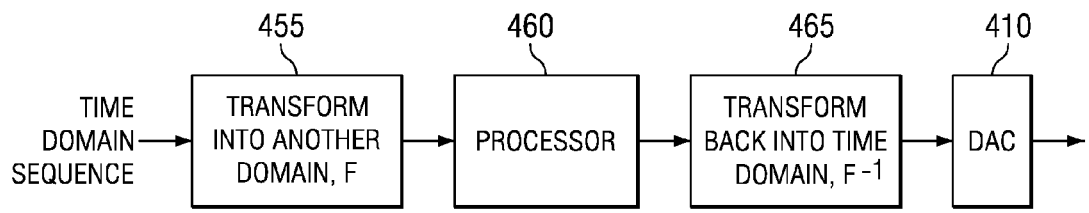

With reference now to FIGS. 4a and 4b, there are shown diagrams illustrating additional processing and manipulation that a time-domain sequence, such as a PLCP preamble, may undergo prior to transmission, according to a preferred embodiment of the present invention. As shown in FIG. 4a, the time-domain sequence may undergo a transformation, such as a time-domain filtering operation by a filter 405. An example of the filter 405 may be a pulse-shape filter implementing a square-root raised cosine pulse shape. The pulse shape filter may be used to place a spectral limit on the time-domain sequence, which may have infinite bandwidth prior to filtering. The spectral limit may be due to technical and/or regulatory requirements. A digital-to-analog converter (DAC) 410 may be used to convert the time-domain sequence into an analog signal that can be provided to transmit circuitry for transmission purposes.

In addition to being filtered, the time-domain sequence may undergo processing in alternate domain representations. As shown in FIG. 4b, the time-domain sequence may be converted into another domain by transform 455; For example, the time-domain sequence may be converted into a frequency domain sequence. After the transformation into another domain, a processor 460 may be used to provide desired processing of the sequence. Examples of the processing that can be performed upon the sequence may be magnitude clipping, shaping (such as to provide a shape to a flat sequence or to provide a desired roll-off), and pre-emphasis (to compensate for the behavior of circuitry or antennas, for example). After processing, an inverse transform 465 can be used to return the sequence back into the time-domain and the DAC 410 can be used to convert the time-domain sequence into an analog signal that can be provided to transmit circuitry.

According to a preferred embodiment of the present invention, the operations that the filter 405 or the transform 455, processor 460, and inverse transform 465 can perform to the PLCP preamble 105 can be performed while the communications system is not on-line and the results may be stored in memory for later use. Since there may be a limited number of PLCP preambles 105, off-line computation of the processing can be feasible since it can significantly reduce computational requirements during normal operations. Alternatively, if there are sufficient computational resources available, the processing can be performed in real-time to reduce storage requirements.

The complexity of a digital circuit can have an effect upon the amount of power consumed while the digital circuit is in operation. For example, a correlator that is correlating a short sequencewill tend to be less complex than a correlator designed to work with a long sequence. Therefore, it may be desirable to perform multiple correlations of short sequences as opposed to a single correlation of a long sequence.

The spreading of a bi-phase sequence with another bi-phase sequence can create a hierarchical sequence. A bi-phase sequence is a sequence that has the property of havirig the minimum peak side-lobe of all possible sequences for a given length. Note that besides from creating a longer sequence by spreading two shorter bi-phase sequences (which may not be guaranteed to produce a bi-phase sequence), another way to create a bi-phase sequence is to perform an exhaustive search. Note that more than two sequences can be used. However, the chances of having the result being a bi-phase sequence can be reduced greatly.

Figure 5:
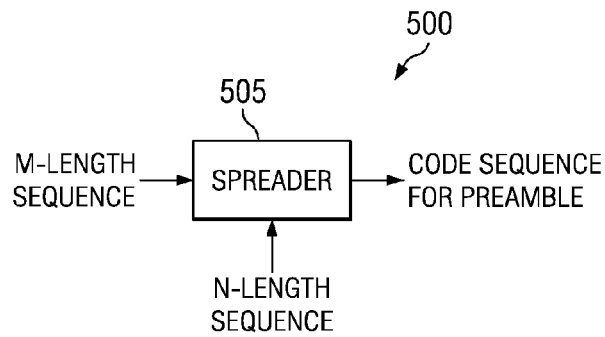
FIG. 5 is a diagram of the creation of a code sequence by spreading one sequence with another sequence, according to a preferred embodiment of the present invention.

With reference now to FIG. 5, there is shown a diagram illustrating a circuit 500 for the spreading of one sequence with another sequence to create a code sequence for use in a PLCP preamble, according to a preferred embodiment of the present invention. The circuit 500 can be used for creating a code sequence by spreading two shorter length sequences. The code sequence, which can be a 128-length sequence, according to a preferred embodiment of the present invention, can be created by spreading a first sequence (M-length) by a second sequence (N-length), wherein M*N can be equal to 128. For example, M may be equal to 16 while N may be equal to eight (8).

As shown in FIG. 5, the first sequence (M-length) and the second sequence (N-length) may be provided to a spreader 505. Output of the spreader 505 may be the code sequence that can be used in the creation of a PLCP preamble. Let the M-length sequence be represented as $\{b_0 b_1 \ldots b_{15}\}$ and the N-length sequence be represented as $\{a_0 a_1 \ldots a_7\}$, then the M*N-length sequence (the output of the spreader 505) can be represented as $\{b_0 a_0\ b_0 a_1\ b_0 a_2 \ldots b_0 a_7\ b_1 a_0 \ldots b_{15} a_7\}$. For illustrative purposes, let the first sequence be $\{1, 1, 1, 1, -1, -1, 1, 1, -1, -1, 1, -1, 1, -1, 1, 1\}$ and the second sequence be $\{1, -1, -1, -1, 1, 1, -1, 1\}$. With these two sequences as input, the output of the spreader 505 will be a 128-length sequence and may be found in Table 7. Please refer to Tables 5 and 6 for other M- and N-length sequences that can be used to create hierarchical sequences which may be used to create PLCP preambles. Note that it may be possible that more than two sequences can be spread to produce a code sequence that can be used as the time-domain packet synchronization sequence. However, significant improvement over the use of two sequences may not be present.

Note that even if each of the individual sequences (the 16-length and the 8-length sequences, for example) has the minimum peak side-lobes, i.e., they are bi-phase sequences, this alone may not ensure that the resulting sequence (when one sequence is spread with another) has the minimum peak side-lobes. Therefore, hierarchical sequences can also be found through exhaustive search. Please refer to Tables 1 through 5 for five such sequences.

Figure 6A:
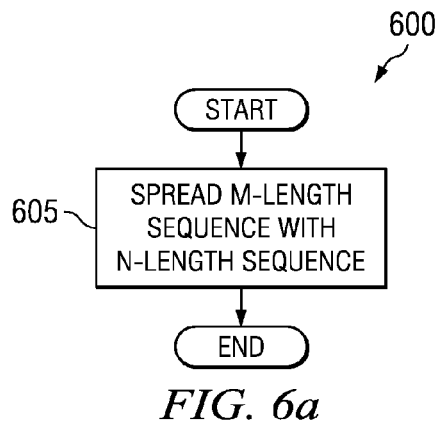
FIGS. 6*a* and 6*b* are diagrams of algorithms for creating a code sequence and despreading a received signal with a hierarchical sequence, according to a preferred embodiment of the present invention.
Figure 6B:
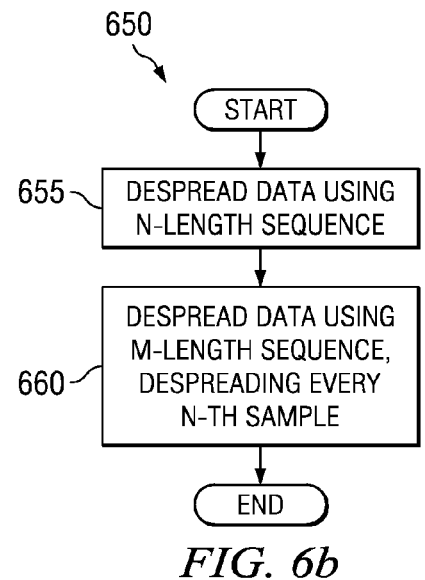

With reference now to FIGS. 6a and 6b, there are shown diagrams illustrating algorithms for creating a code sequence (algorithm 600, FIG. 6a) and despreading a hierarchical sequence (algorithm 650, FIG. 6b), according to a preferred embodiment of the present invention. With reference first to FIG. 6a, as discussed previously, the creation of a code sequence wherein the code sequence is a hierarchical sequence can involve the spreading of a first sequence, for example, an M-length sequence with a second sequence, for example, an N-length sequence (block 605). For example, if M and N were 16- and 8-length sequences respectively, the result would be a 128-length sequence.

With reference now to FIG. 6b, a hierarchical sequence can undergo two operations in order to remove the hierarchical sequence. A first operation may involve the removal of a first spreading sequence. For example, using the example discussed above wherein hierarchical sequence was created by spreading an M-length sequence with an N-length sequence, then the first despreading operation can involve despreading the received signal with the N-length spreading sequence (block 655). A second operation may then involve the despreading with an M-length spreading sequence. To ensure that the data stream is reconstructed properly, every N-th chip should be despread with the M-length spreading sequence in order to reconstruct a single bit of data rather than M consecutive chips (block 660).

The order in which the despreading occurs may not be important in the reconstruction of the data. For example, if the hierarchical sequence was created with an M-length sequence being spread with an N-length sequence, then the despreading could be performed with the N-length sequence first, followed by the M-length sequence, wherein the despreading with the M-length sequence should be applied to every N-th chip or with the M-length sequence first, followed by the N-length sequence, wherein the despreading with the M-length sequence should be applied to every N-th chip.

As discussed previously, the complexity of a digital circuit can have a direct impact on the amount of power consumed by the digital circuit when it is operating. The following discussion compares the complexity and power consumption of a correlator designed to be used with a hierarchical sequence and a correlator designed to be used with a 128-length sequence. Assuming the use of a 1-bit analog-to-digital converter (ADC), a first stage of the correlator with the hierarchical sequence, 16 1-bit numbers are added together. On average, each add could correspond to 10 gates. This implies a total of 160 gates to implement the first stage. For a second stage, eight 4-bit numbers could be added together. In the second stage, each add could correspond to 75 gates. This implies a total of 600 gates to implement the second stage. The power consumption for the correlator for the hierarchical sequence could then be 760 gates*528 MHz*5.2 nW per MHz=2.1 mW (assuming that the correlator operates at 528 MHz and each gate consumes 5.2 nW per MHz).

The correlator for the 128-length sequence could require 128 1-bit adds. On average, each add could correspond to 60 gates, for a total of 7680 gates. Note the difference in the number of gates per typical add may be due to a larger number of stages required to perform the correlation. Then, the power consumption for the correlator for the 128-length sequence could then be 7680 gates*528 MHz*5.2 nW per MHz=21 mW (again, assuming that the correlator operates at 528 MHz and each gate consumes 5.2 nW per MHz). Notice the tenfold increase in power consumption by the correlator designed to operate on the 128-length sequence when compared with the correlator designed to operate on hierarchical sequences.

Figure 7:
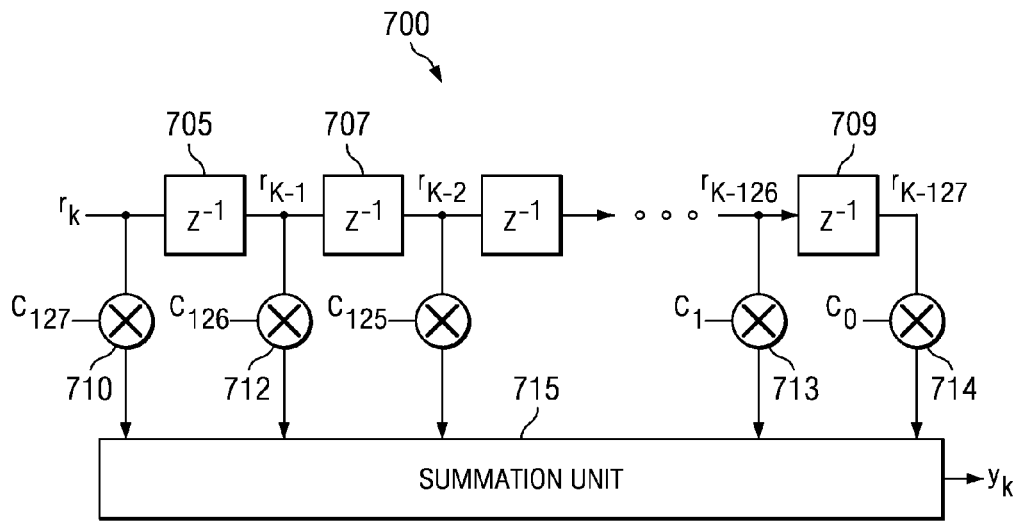
FIG. 7 is a diagram of a despreader for use in removing a spreading sequence from a received signal.

With reference now to FIG. 7, there is shown a diagram illustrating a despreader 700 for use in remove a spreading sequence from a received signal. The despreader 700 may also be used to detect a particular sequence in a preamble. As discussed above, the despreader 700 performs the despreading with the entire spreading sequence at one time, for example, the despreader 700 would despread received data that was originally spread with a spreading sequence of length 128 with the 128-length sequence. As displayed in FIG. 7, the despreader 700 can be implemented as a tapped delay line. Tapped delay lines are considered to be well understood by those of ordinary skill in the art of the present invention and will not be discussed in detail.

For discussion purposes, let $r_k$ denote the k-th chip of the received signal, $y_k$ denote the k-th chip of the despread data, and $c_j$ be the j-th coefficient of the spreading sequence. The received signal may be provided to a linear array of delay elements, for example, delay element 705 and 707. Note that the linear array of delay elements may be referred to as a tapped delay line. The delay elements may have a unity delay. Therefore, if $r_k$ is the input to the delay element 705, then $r_{k-1}$ is the output of the delay element 705 while $r_{k-2}$ is the output of the delay element 707. If the spreading sequence is of length q, then there can be q−1 delay elements in the tapped delay line. In addition to having an output coupled to the following delay element, the output of each delay element may also be coupled to a multiplier. For example, delay element 705 may have its output coupled to delay element 707 as well as multiplier 712. Note that an additional multiplier, multiplier 710, may have as its input, the received signal, $r_k$.

Each multiplier has as a second input a coefficient of the spreading sequence, with a multiplier coupled to a first delay element in the tapped delay line having the last coefficient of the spreading sequence ($c_q$). The second input to each of the subsequent multipliers are the remaining coefficients of the spreading sequence. For example, with the 128-length spreading sequence, then the second input to the multiplier 710 would be $c_{127}$ and for multiplier 712, it would be $c_{126}$. Output from each of the multipliers can then be provided to a summation unit 715 that can combine the outputs together to produce the despread data.

Figure 8A:
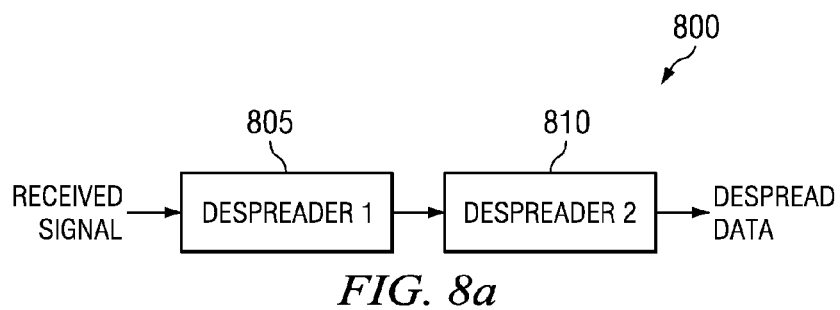
FIGS. 8*a*, 8*b*, and 8*c* are diagrams of a despreader for use in removing a spreading sequence from a received signal, wherein the spreading sequence is a hierarchical spreading sequence and the despreading is performed in multiple steps, according to a preferred embodiment of the present invention.

With reference now to FIG. 8*a*, there is shown a diagram illustrating a high-level view of a two-stage despreader 800 for use in removing a hierarchical spreading sequence from a received signal, according to a preferred embodiment of the present invention. The two-stage despreader 800 may also be used to detect a sequence in a preamble. When a hierarchical sequence is used as a spreading sequence, the despreading of the received signal may also be performed using a despreader similar to the despreader 700 (FIG. 7) wherein the despreading is performed in a single step with the full spreading sequence. However, as discussed above, the single step despreading can lead to a complex despreader that consumes a large amount of power. Therefore, when a hierarchical spreading sequence is used, the despreading can occur as a two-step operation. The resulting despreader may be smaller and therefore use less power.

The received signal may first be provided to a first despreader 805, which can perform a despreading operation with a second sequence, wherein the hierarchical spreading sequence may be the result of the first sequence being spread with a second-sequence. Note that if the first sequence is of length M and the second sequence is of length N, then the hierarchical spreading sequence is of length M*N. After being despread with the second sequence in the first despreader 805, the output of the first despreader 805 may then be provided to a second despreader 810, which can perform a despreading on the output of the first despreader 805 with the first sequence. Note that the second despreader 810 should despread every N-th output of the first despreader.

According to a preferred embodiment of the present invention, the order of the despreading can be independent of the order of the spreading. If the first despreader 805 were to despread the received signal with the first sequence (the M-length sequence), then the first despreader 805 should despread every N-th received signal. The output of the first despreader 805 may then be provided to the second despreader 810, which can despread every output of the first despreader 805 with the second sequence (the N-length sequence).

Figure 8B:
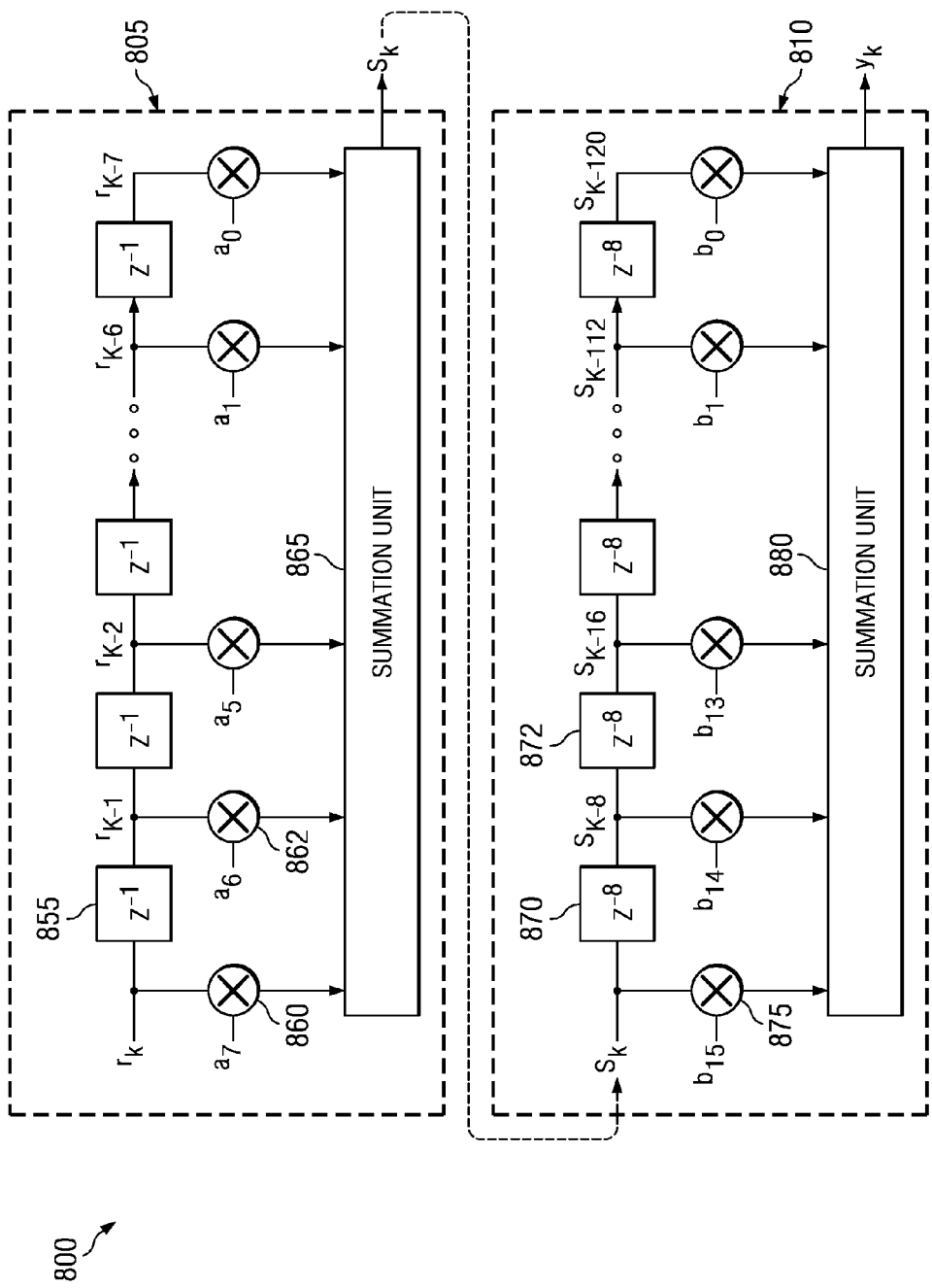

With reference now to FIG. 8*b*, there is shown a diagram illustrating a detailed view of the two-stage despreader 800 for use in removing a hierarchical spreading sequence from a received signal, according to a preferred embodiment of the present invention. As shown in FIG. 8*b*, the first despreader 805 will despread with the N-length spreading sequence and the second despreader 810 will despread with the M-length spreading sequence.

The design of the first and the second despreaders 805 and 810 uses the tapped delay line structure of the despreader 700 (FIG. 7), with differences mainly in the coefficients, the value of the delay elements, and the input signals. Since the first despreader 805 despreads the received signal with the N-length spreading sequence, the received signal, $r_k$, can be the input to the first despreader 805 at the tapped delay line. As in the despreader 700, the number of delay elements should be one less than the length of the spreading sequence (N). According to a preferred embodiment of the present invention, each of the delay elements (for example, delay element 855) may have a unity delay. Coupled to each of the delay elements is a multiplier that can be used to multiply the output of the delay element with a coefficient of the spreading sequence, with an additional multiplier being coupled to the received signal, $r_k$. For example, a multiplier 860 multiplies the received signal, $r_k$, with an eight coefficient of the N-length spreading sequence, while a multiplier 862 multiplies the output of delay element 855 with a seventh coefficient of the N-length spreading sequence. A summation unit 865 combines the outputs of the multipliers to form an intermediate signal, $s_k$.

The second despreader 810, which despreads every N-th output produced by the first despreader 805, has a design that differs slightly from the design of the first despreader 805. The second despreader 810 also makes use of a tapped delay line, but rather than the delay elements having unity delay, the delay elements (such as delay elements 870 and 872) have delays that can be equal to the length of the spreading sequence used in the first despreader 805, which in this discussion, is N=8. The number of delay elements in the tapped delay line is one less than the length of the spreading sequence (M) while the number of multipliers (such as multiplier 875) is equal to the length of the spreading sequence (M). As in the first despreader 805, the multipliers multiply the outputs of the delay elements with the coefficients of the spreading sequence. For example, the multiplier 875 multiplies the intermediate signal, $s_k$, with a sixteenth coefficient of the spreading sequence. A summation unit 880 combines the outputs of the multipliers to produce the despread data, $y_k$.

Figure 8C:
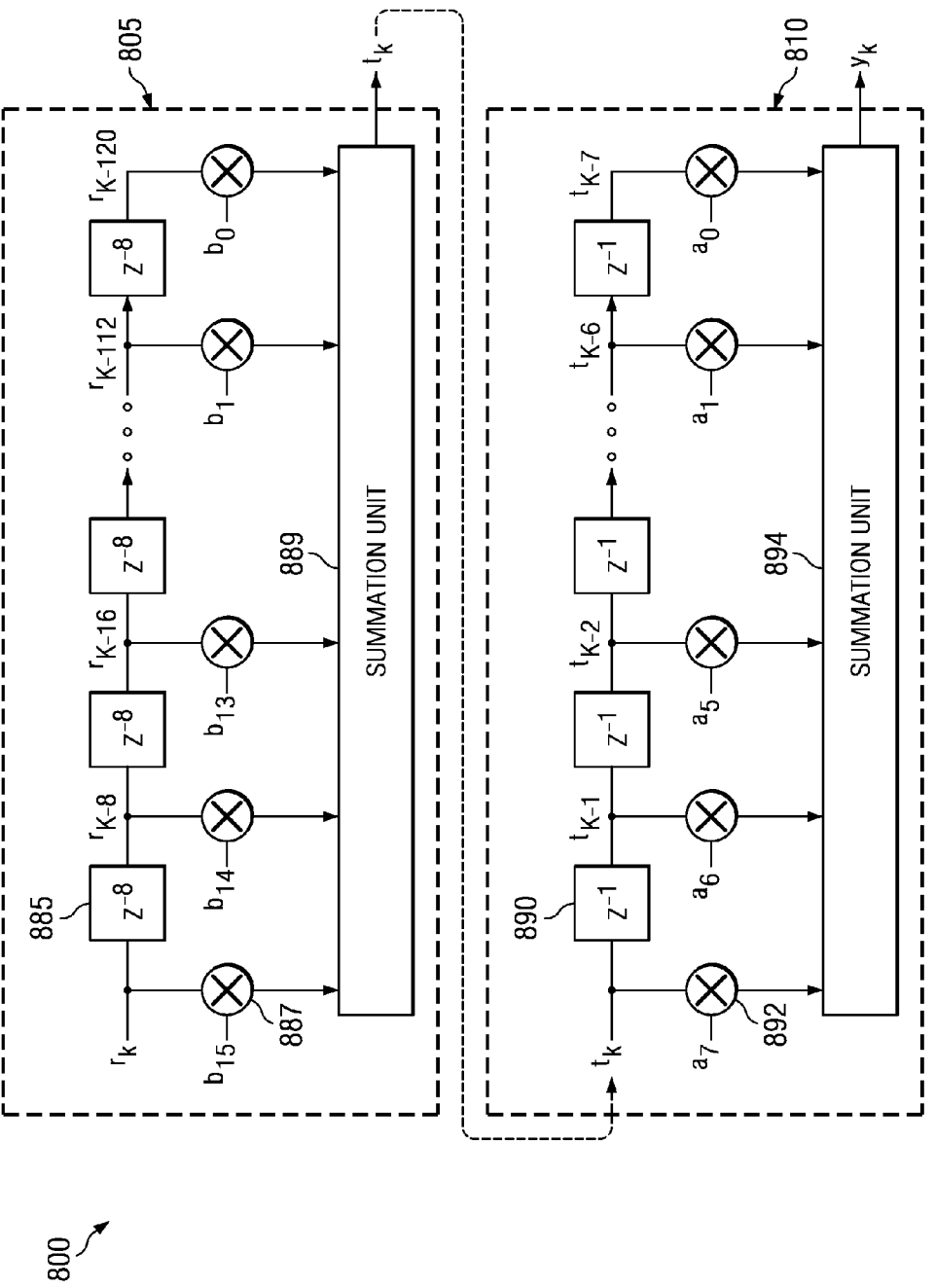

With reference now to FIG. 8*c*, there is shown a diagram illustrating a detailed view of the two-stage despreader 800 for use in removing a hierarchical spreading sequence from a received signal, according to a preferred embodiment of the present invention. As shown in FIG. 8*c*, the first despreader 805 will despread with the M-length spreading sequence and the second despreader 810 will despread with the N-length spreading sequence.

Since the received signal may have been originally an M-length sequence that was spread with an N-length sequence, the first despreader 805 may be configured to despread every N-th received signal. This may be accomplished by using a tapped delay line with delay elements, such as delay element 885, having a delay equal to N=8. Multipliers, such as multiplier 887 can multiply the outputs of the delay elements (or in the case of the multiplier 887, the received signal) with coefficients of the M-length spreading sequence. A summation unit 889 can combine the outputs of the multipliers to produce an intermediate value, $t_k$.

The second despreader 810 may have a more conventional design, wherein its tapped delay line may have delay elements, such as delay element 890, with unity delay. Again, multipliers, such as multiplier 892 can multiply the outputs of the delay elements (or in the case of the multiplier 892, the intermediate signal) with the coefficients of the N-length spreading sequence. A summation unit 894 can combine the outputs of the multipliers to produce the despread data, $y_k$.

Piconets, by their very nature, tend to have relatively small coverage areas. This can permit multiple piconets to operate within close vicinity of one another. When the piconets that are operating in close vicinity with one another are operating in a coordinated fashion, then transmissions from devices in the piconets can be arranged so that they do not interfere with one another (for example, transmissions from devices in different piconets can be made at different frequency bands or the transmissions could occur at different times). However, when the piconets are un-coordinated, then it may be possible that transmissions will interfere. For example, a transmission from a device in a first piconet can occur at the same time as a transmission from a device in a second piconet. If both transmissions use the same preamble, then a device that is in the operating range of the two piconets could lock onto the transmission from the first piconet and miss the transmission from the second piconet. This can then lead to a loss of any information contained in the transmission from the second piconet. This can also lead to a situation that can be referred to as a 'false lock' wherein the device locks onto one transmission thinking that it is from a desired transmitter when the transmission is in fact from a different transmitter. This may result in a higher than acceptable packet error rate (PER).

Another problem that can be associated with multiple uncoordinated piconets using a single preamble is that a device may not be able to distinguish which piconet a transmission that it has received originated from. The receiver may then be required to perform decoding of the transmission in order to determine the identity of the sender of the transmission. If the receiver did not wish to receive a transmission from this sender, then the receiver has just performed some unnecessary operations. For wireless devices, this can lead to shorter battery life due to the expenditure of power needed to decode the transmissions. Furthermore, the time spent in decoding the received transmissions can be spent in performing other tasks.

With reference now to FIG. 9, there is shown a diagram illustrating a coverage area map 900 of several piconets, according to a preferred embodiment of the present invention. The coverage area map 900 displays the operational range for devices in three piconets: piconet A 905, piconet B 910, and piconet C 915. The coverage area map 900 shows that the operational ranges for devices in the three piconets have some degree of overlap, for example, the operational range of piconet A 905 overlaps the operational range of both piconet B 910 and piconet C 915.

Located in the middle of the coverage area map 900 may be a device 920, such as a receiver, a multimedia device, a terminal, a printer, a storage device, a wireless device, or so forth. Note that the device 920 may lie within the operational range of all three piconets. Therefore, the device 920 may receive transmissions from other devices located in any (or all) three piconets. If devices in the three piconets all use the same preamble, it may be impossible for the device 920 to distinguish the originator of a transmission until it has decoded the transmission. Furthermore, the inability to distinguish the origin of a transmission may lead to the loss of desired transmissions due to confusion about the origination of transmissions.

A solution to these problems may be that transmissions from devices in different piconets use different preambles. The use of unique preambles can permit a receiver to identify which piconet a transmission is associated with, without needing to perform any decoding of the transmission itself. Furthermore, since transmissions associated with different piconets can be uniquely identified, 'false lock' may no longer be a problem. This can lead to an improved PER and therefore more robust communications may be a result.

Note that the use of unique preambles may apply to a preamble's packet synchronization sequence and frame synchronization sequence, but may not apply to the preamble's channel estimation sequence since the purpose of the channel estimation sequence may be to help estimate the frequency response of the communications channel. This may be true since in many cases by the time a receiver receives the channel estimation sequence, the uniqueness of the packet and frame synchronization sequences have already been detected and the source of the transmission has already been determined. Therefore, there may not be a need for as many unique sequences that can be used in the creation of channel estimation sequences.

With reference now to FIG. 10, there is shown a diagram illustrating a mapping of a piconet identifier to a unique sequence, according to a preferred embodiment of the present invention. In order to implement the use of unique preambles, there may be required a mechanism to uniquely associate a piconet with a unique sequence that may be used to create the unique preamble (or the unique preamble itself). According to a preferred embodiment of the present invention, a piconet may have a unique identifier, such as its name, identification number, access number, or so forth. This unique identifier may be assigned to a piconet during installation/configuration or it may be assigned during manufacture, wherein each piconet produced by a manufacturer may be given a unique identifier.

Through this unique identifier (block 1005), an association with a unique sequence can be made (block 1010). For example, if there may be three piconets operating within close proximity of one another, each of the three piconet's identifiers can be used to associate a unique sequence (or unique preamble). The piconet's identifier may also be used to associate a specific transmit pattern to the piconet. The piconet can use the transmit pattern associated with it in order to help reduce transmission collisions. Furthermore, depending upon the transmit pattern associated with the piconet, a PLCP preamble format may be selected. For example, if the transmit pattern has consecutive transmissions on the same transmission band, then an interleaved PLCP preamble (such as those shown in FIGS. 2b and 3b) may be used or if the transmit pattern does not have consecutive transmissions on the same transmission band, then a disjoint PLCP preamble (such as those shown in FIGS. 2a and 3a) may be used.

With reference now to FIG. 11, there is shown a diagram illustrating an algorithm 1100 for use in distinguishing transmissions from multiple piconets, according to a preferred embodiment of the present invention. As discussed above, when there are multiple piconets operating within a general area, it can be difficult to determine which piconet a transmission originated from if the piconets are not using unique preambles. When unique preambles are not being used, then a receiver of a transmission may not be able to determine the source of a transmission until it has decoded the contents of the transmission. However, when unique preambles are used, then the determination of the source of a transmission can be simpler.

According to a preferred embodiment of the present invention, the algorithm 1100 may execute within a controller, processing element, central processor, custom designed integrated circuit, or so forth of a receiver. The algorithm 1100 may be executed each time the receiver detects the presence of a transmission. The controller may begin by determining the code sequence that is in the preamble (block 1105). This code sequence should be unique to the piconet that originated the transmission. For example, using the PLCP preambles discussed above, the packet synchronization sequence 211 (FIG. 2a) may contain up to 21 copies of a sequence while the frame synchronization sequence 221 (FIG. 2a) may contain up to three copies of an inverse of the sequence. The determination of the presence of a code sequence in the PLCP preamble can be made by using a despreader, such as those shown in FIGS. 8a, 8b, and 8c.

Once the controller is able to determine the code sequence used in the creation of the preamble, the code sequence can be used to identify the piconet which is the source of the transmission (block 1110). Note that the identification process may be a reverse mapping of the mapping shown in FIG. 10. The identification of the piconet can be accomplished by looking up the identity of the piconet in a look-up table that can-be indexed by the code sequence, with the reverse mapping providing the piconet's identifier. Alternatively, since the number of piconets operating in an area may be small, a simple search in a list of piconets and their associated code sequence can be accomplished in short order without affecting the overall performance of the receiver. After identifying the source of the transmission, the controller may decide on a course of events depending upon its programming.

Although the present invention and its advantages have been described in detail, it should be understood that various changes, substitutions and alterations can be made herein without departing from the spirit and scope of the invention as defined by the appended claims. For example, the above discussion discloses the structure of several preambles, specific lengths for the sequences used in the frame and packet synchronization sequences and the channel estimation sequence, the size of the guard bands, and so forth. Note that the structure of the preambles may change, the lengths of the sequences and guard bands may change, and the sequences themselves may change without affecting the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

TABLE 1

Time-domain packet synchronization sequence one

| Sequence Element | Value |
|---|---|
| $C_0$ | 0.6564 |
| $C_1$ | −1.3671 |
| $C_2$ | −0.9958 |
| $C_3$ | −1.3981 |
| $C_4$ | 0.8481 |
| $C_5$ | 1.0892 |
| $C_6$ | −0.8621 |
| $C_7$ | 1.1512 |
| $C_8$ | 0.9602 |
| $C_9$ | −1.3581 |
| $C_{10}$ | −0.8354 |
| $C_{11}$ | −1.3249 |
| $C_{12}$ | 1.0964 |
| $C_{13}$ | 1.3334 |
| $C_{14}$ | −0.7378 |
| $C_{15}$ | 1.3565 |
| $C_{16}$ | 0.9361 |

TABLE 1-continued

Time-domain packet synchronization sequence one

| Sequence Element | Value |
|---|---|
| $C_{17}$ | −0.8212 |
| $C_{18}$ | −0.2662 |
| $C_{19}$ | −0.6866 |
| $C_{20}$ | 0.8437 |
| $C_{21}$ | 1.1237 |
| $C_{22}$ | −0.3265 |
| $C_{23}$ | 1.0511 |
| $C_{24}$ | 0.7927 |
| $C_{25}$ | −0.3363 |
| $C_{26}$ | −0.1342 |
| $C_{27}$ | −0.1546 |
| $C_{28}$ | 0.6955 |
| $C_{29}$ | 1.0608 |
| $C_{30}$ | −0.1600 |
| $C_{31}$ | 0.9442 |
| $C_{32}$ | −0.0844 |
| $C_{33}$ | 1.1974 |
| $C_{34}$ | 1.2261 |
| $C_{35}$ | 1.4401 |
| $C_{36}$ | −0.5988 |
| $C_{37}$ | −0.4675 |
| $C_{38}$ | 0.8520 |
| $C_{39}$ | −0.8922 |
| $C_{40}$ | −0.5603 |
| $C_{41}$ | 1.1886 |
| $C_{42}$ | 1.1128 |
| $C_{43}$ | 1.0833 |
| $C_{44}$ | −0.9073 |
| $C_{45}$ | −1.6227 |
| $C_{46}$ | 1.0013 |
| $C_{47}$ | −1.6067 |
| $C_{48}$ | 0.3360 |
| $C_{49}$ | −1.3136 |
| $C_{50}$ | −1.4448 |
| $C_{51}$ | −1.7238 |
| $C_{52}$ | 1.0287 |
| $C_{53}$ | 0.6100 |
| $C_{54}$ | −0.9237 |
| $C_{55}$ | 1.2618 |
| $C_{56}$ | 0.5974 |
| $C_{57}$ | −1.0976 |
| $C_{58}$ | −0.9776 |
| $C_{59}$ | −0.9982 |
| $C_{60}$ | 0.8967 |
| $C_{61}$ | 1.7640 |
| $C_{62}$ | −1.0211 |
| $C_{63}$ | 1.6913 |
| $C_{64}$ | −0.2095 |
| $C_{65}$ | 1.1640 |
| $C_{66}$ | 1.2334 |
| $C_{67}$ | 1.5338 |
| $C_{68}$ | −0.8844 |
| $C_{69}$ | −0.3857 |
| $C_{70}$ | 0.7730 |
| $C_{71}$ | −0.9754 |
| $C_{72}$ | −0.2315 |
| $C_{73}$ | 0.5579 |
| $C_{74}$ | 0.4035 |
| $C_{75}$ | 0.4248 |
| $C_{76}$ | −0.3359 |
| $C_{77}$ | −0.9914 |
| $C_{78}$ | 0.5975 |
| $C_{79}$ | −0.8408 |
| $C_{80}$ | 0.3587 |
| $C_{81}$ | −0.9604 |
| $C_{82}$ | −1.0002 |
| $C_{83}$ | −1.1636 |
| $C_{84}$ | 0.9590 |
| $C_{85}$ | 0.7137 |
| $C_{86}$ | −0.6776 |
| $C_{87}$ | 0.9824 |
| $C_{88}$ | −0.5454 |
| $C_{89}$ | 1.1022 |
| $C_{90}$ | 1.6485 |

TABLE 1-continued

Time-domain packet synchronization sequence one

| Sequence Element | Value |
|---|---|
| $C_{91}$ | 1.3307 |
| $C_{92}$ | −1.2852 |
| $C_{93}$ | −1.2659 |
| $C_{94}$ | 0.9435 |
| $C_{95}$ | −1.6809 |
| $C_{96}$ | 0.4232 |
| $C_{97}$ | −1.2684 |
| $C_{98}$ | −1.8151 |
| $C_{99}$ | −1.4829 |
| $C_{100}$ | 1.0302 |
| $C_{101}$ | 0.9419 |
| $C_{102}$ | −1.1472 |
| $C_{103}$ | 1.4858 |
| $C_{104}$ | −0.6794 |
| $C_{105}$ | 0.9573 |
| $C_{106}$ | 1.0807 |
| $C_{107}$ | 1.1445 |
| $C_{108}$ | −1.2312 |
| $C_{109}$ | −0.6643 |
| $C_{110}$ | 0.3836 |
| $C_{111}$ | −1.1482 |
| $C_{112}$ | −0.0353 |
| $C_{113}$ | −0.6747 |
| $C_{114}$ | −1.1653 |
| $C_{115}$ | −0.8896 |
| $C_{116}$ | 0.2414 |
| $C_{117}$ | 0.1160 |
| $C_{118}$ | −0.6987 |
| $C_{119}$ | 0.4781 |
| $C_{120}$ | 0.1821 |
| $C_{121}$ | −1.0672 |
| $C_{122}$ | −0.9676 |
| $C_{123}$ | −1.2321 |
| $C_{124}$ | 0.5003 |
| $C_{125}$ | 0.7419 |
| $C_{126}$ | −0.8934 |
| $C_{127}$ | 0.8391 |

TABLE 2

Time-domain packet synchronization sequence two

| Sequence Element | Value |
|---|---|
| $C_0$ | 0.9679 |
| $C_1$ | −1.0186 |
| $C_2$ | 0.4883 |
| $C_3$ | 0.5432 |
| $C_4$ | −1.4702 |
| $C_5$ | −1.4507 |
| $C_6$ | −1.1752 |
| $C_7$ | −0.0730 |
| $C_8$ | −1.2445 |
| $C_9$ | 0.3143 |
| $C_{10}$ | −1.3951 |
| $C_{11}$ | −0.9694 |
| $C_{12}$ | 0.4563 |
| $C_{13}$ | 0.3073 |
| $C_{14}$ | 0.6408 |
| $C_{15}$ | −0.9798 |
| $C_{16}$ | −1.4116 |
| $C_{17}$ | 0.6038 |
| $C_{18}$ | −1.3860 |
| $C_{19}$ | −1.0888 |
| $C_{20}$ | 1.1036 |
| $C_{21}$ | 0.7067 |
| $C_{22}$ | 1.1667 |
| $C_{23}$ | −1.0225 |
| $C_{24}$ | −1.2471 |
| $C_{25}$ | 0.7788 |

TABLE 2-continued

Time-domain packet synchronization sequence two

| Sequence Element | Value |
|---|---|
| $C_{26}$ | −1.2716 |
| $C_{27}$ | −0.8745 |
| $C_{28}$ | 1.2175 |
| $C_{29}$ | 0.8419 |
| $C_{30}$ | 1.2881 |
| $C_{31}$ | −0.8210 |
| $C_{32}$ | −1.2905 |
| $C_{33}$ | 1.1040 |
| $C_{34}$ | −1.2408 |
| $C_{35}$ | −0.8062 |
| $C_{36}$ | 1.5425 |
| $C_{37}$ | 1.0955 |
| $C_{38}$ | 1.4284 |
| $C_{39}$ | −0.4593 |
| $C_{40}$ | −1.0408 |
| $C_{41}$ | 1.0542 |
| $C_{42}$ | −0.4446 |
| $C_{43}$ | −0.7929 |
| $C_{44}$ | 1.6733 |
| $C_{45}$ | 1.7568 |
| $C_{46}$ | 1.3273 |
| $C_{47}$ | −0.2465 |
| $C_{48}$ | 1.6850 |
| $C_{49}$ | −0.7091 |
| $C_{50}$ | 1.1396 |
| $C_{51}$ | 1.5114 |
| $C_{52}$ | −1.4343 |
| $C_{53}$ | −1.5005 |
| $C_{54}$ | −1.2572 |
| $C_{55}$ | 0.8274 |
| $C_{56}$ | −1.5140 |
| $C_{57}$ | 1.1421 |
| $C_{58}$ | −1.0135 |
| $C_{59}$ | −1.0657 |
| $C_{60}$ | 1.4073 |
| $C_{61}$ | 1.8196 |
| $C_{62}$ | 1.1679 |
| $C_{63}$ | −0.4131 |
| $C_{64}$ | 1.5280 |
| $C_{65}$ | −0.9193 |
| $C_{66}$ | 1.1246 |
| $C_{67}$ | 1.2622 |
| $C_{68}$ | −1.4406 |
| $C_{69}$ | −1.4929 |
| $C_{70}$ | −1.1508 |
| $C_{71}$ | 0.4126 |
| $C_{72}$ | −1.0462 |
| $C_{73}$ | 0.7232 |
| $C_{74}$ | −1.1574 |
| $C_{75}$ | −0.7102 |
| $C_{76}$ | 0.8502 |
| $C_{77}$ | 0.6260 |
| $C_{78}$ | 0.9530 |
| $C_{79}$ | −0.4971 |
| $C_{80}$ | −0.8633 |
| $C_{81}$ | 0.6910 |
| $C_{82}$ | −0.3639 |
| $C_{83}$ | −0.8874 |
| $C_{84}$ | 1.5311 |
| $C_{85}$ | 1.1546 |
| $C_{86}$ | 1.1935 |
| $C_{87}$ | −0.2930 |
| $C_{88}$ | 1.3285 |
| $C_{89}$ | −0.7231 |
| $C_{90}$ | 1.2832 |
| $C_{91}$ | 0.7878 |
| $C_{92}$ | −0.8095 |
| $C_{93}$ | −0.7463 |
| $C_{94}$ | −0.8973 |
| $C_{95}$ | 0.5560 |
| $C_{96}$ | 0.5193 |
| $C_{97}$ | −0.3439 |
| $C_{98}$ | 0.1428 |
| $C_{99}$ | 0.6251 |

TABLE 2-continued

Time-domain packet synchronization sequence two

| Sequence Element | Value |
|---|---|
| $C_{100}$ | −1.0468 |
| $C_{101}$ | −0.5798 |
| $C_{102}$ | −0.8237 |
| $C_{103}$ | 0.2667 |
| $C_{104}$ | −0.9563 |
| $C_{105}$ | 0.6016 |
| $C_{106}$ | −0.9964 |
| $C_{107}$ | −0.3541 |
| $C_{108}$ | 0.3965 |
| $C_{109}$ | 0.5201 |
| $C_{110}$ | 0.4733 |
| $C_{111}$ | −0.2362 |
| $C_{112}$ | −0.6892 |
| $C_{113}$ | 0.4787 |
| $C_{114}$ | −0.2605 |
| $C_{115}$ | −0.5887 |
| $C_{116}$ | 0.9411 |
| $C_{117}$ | 0.7364 |
| $C_{118}$ | 0.6714 |
| $C_{119}$ | −0.1746 |
| $C_{120}$ | 1.1776 |
| $C_{121}$ | −0.8803 |
| $C_{122}$ | 1.2542 |
| $C_{123}$ | 0.5111 |
| $C_{124}$ | −0.8209 |
| $C_{125}$ | −0.8975 |
| $C_{126}$ | −0.9091 |
| $C_{127}$ | 0.2562 |

TABLE 3

Time-domain packet synchronization sequence three

| Sequence Element | Value |
|---|---|
| $C_0$ | 0.4047 |
| $C_1$ | 0.5799 |
| $C_2$ | −0.3407 |
| $C_3$ | 0.4343 |
| $C_4$ | 0.0973 |
| $C_5$ | −0.7637 |
| $C_6$ | −0.6181 |
| $C_7$ | −0.6539 |
| $C_8$ | 0.3768 |
| $C_9$ | 0.7241 |
| $C_{10}$ | −1.2095 |
| $C_{11}$ | 0.6027 |
| $C_{12}$ | 0.4587 |
| $C_{13}$ | −1.3879 |
| $C_{14}$ | −1.0592 |
| $C_{15}$ | −1.4052 |
| $C_{16}$ | −0.8439 |
| $C_{17}$ | −1.5992 |
| $C_{18}$ | 1.1975 |
| $C_{19}$ | −1.9525 |
| $C_{20}$ | −1.5141 |
| $C_{21}$ | 0.7219 |
| $C_{22}$ | 0.6982 |
| $C_{23}$ | 1.2924 |
| $C_{24}$ | −0.9460 |
| $C_{25}$ | −1.2407 |
| $C_{26}$ | 0.4572 |
| $C_{27}$ | −1.2151 |
| $C_{28}$ | −0.9869 |
| $C_{29}$ | 1.2792 |
| $C_{30}$ | 0.6882 |
| $C_{31}$ | 1.2586 |
| $C_{32}$ | −0.9671 |
| $C_{33}$ | −0.9819 |
| $C_{34}$ | 0.7980 |

TABLE 3-continued

Time-domain packet synchronization sequence three

| Sequence Element | Value |
|---|---|
| $C_{35}$ | −0.8158 |
| $C_{36}$ | −0.9188 |
| $C_{37}$ | 1.5146 |
| $C_{38}$ | 0.8138 |
| $C_{39}$ | 1.3773 |
| $C_{40}$ | 0.2108 |
| $C_{41}$ | 0.9245 |
| $C_{42}$ | −1.2138 |
| $C_{43}$ | 1.1252 |
| $C_{44}$ | 0.9663 |
| $C_{45}$ | −0.8418 |
| $C_{46}$ | −0.6811 |
| $C_{47}$ | −1.3003 |
| $C_{48}$ | −0.3397 |
| $C_{49}$ | −1.1051 |
| $C_{50}$ | 1.2400 |
| $C_{51}$ | −1.3975 |
| $C_{52}$ | −0.7467 |
| $C_{53}$ | 0.2706 |
| $C_{54}$ | 0.7294 |
| $C_{55}$ | 0.7444 |
| $C_{56}$ | −0.3970 |
| $C_{57}$ | −1.0718 |
| $C_{58}$ | 0.6646 |
| $C_{59}$ | −1.1037 |
| $C_{60}$ | −0.5716 |
| $C_{61}$ | 0.9001 |
| $C_{62}$ | 0.7317 |
| $C_{63}$ | 0.9846 |
| $C_{64}$ | −0.7298 |
| $C_{65}$ | −0.9662 |
| $C_{66}$ | 0.9694 |
| $C_{67}$ | −0.8053 |
| $C_{68}$ | −0.9052 |
| $C_{69}$ | 1.5933 |
| $C_{70}$ | 0.8418 |
| $C_{71}$ | 1.5363 |
| $C_{72}$ | 0.3085 |
| $C_{73}$ | 1.3016 |
| $C_{74}$ | −1.5546 |
| $C_{75}$ | 1.5347 |
| $C_{76}$ | 1.0935 |
| $C_{77}$ | −0.8978 |
| $C_{78}$ | −0.9712 |
| $C_{79}$ | −1.3763 |
| $C_{80}$ | −0.6360 |
| $C_{81}$ | −1.2947 |
| $C_{82}$ | 1.6436 |
| $C_{83}$ | −1.6564 |
| $C_{84}$ | −1.1981 |
| $C_{85}$ | 0.8719 |
| $C_{86}$ | 0.9992 |
| $C_{87}$ | 1.4872 |
| $C_{88}$ | −0.4586 |
| $C_{89}$ | −0.8404 |
| $C_{90}$ | 0.6982 |
| $C_{91}$ | −0.7959 |
| $C_{92}$ | −0.5692 |
| $C_{93}$ | 1.3528 |
| $C_{94}$ | 0.9536 |
| $C_{95}$ | 1.1784 |
| $C_{96}$ | 0.2424 |
| $C_{97}$ | 0.5703 |
| $C_{98}$ | −0.6381 |
| $C_{99}$ | 0.7861 |
| $C_{100}$ | 0.9175 |
| $C_{101}$ | −0.4595 |
| $C_{102}$ | −0.2201 |
| $C_{103}$ | −0.7755 |
| $C_{104}$ | −0.2965 |
| $C_{105}$ | −1.1220 |
| $C_{106}$ | 1.7152 |
| $C_{107}$ | −1.2756 |
| $C_{108}$ | −0.7731 |

TABLE 3-continued

Time-domain packet synchronization sequence three

| Sequence Element | Value |
|---|---|
| $C_{109}$ | 1.0724 |
| $C_{110}$ | 1.1733 |
| $C_{111}$ | 1.4711 |
| $C_{112}$ | 0.4881 |
| $C_{113}$ | 0.7528 |
| $C_{114}$ | -0.6417 |
| $C_{115}$ | 1.0363 |
| $C_{116}$ | 0.8002 |
| $C_{117}$ | -0.0077 |
| $C_{118}$ | -0.2336 |
| $C_{119}$ | -0.4653 |
| $C_{120}$ | 0.6862 |
| $C_{121}$ | 1.2716 |
| $C_{122}$ | -0.8880 |
| $C_{123}$ | 1.4011 |
| $C_{124}$ | 0.9531 |
| $C_{125}$ | -1.1210 |
| $C_{126}$ | -0.9489 |
| $C_{127}$ | -1.2566 |

TABLE 4

Time-domain packet synchronization sequence four

| Sequence Element | Value |
|---|---|
| $C_{0}$ | 1.1549 |
| $C_{1}$ | 1.0079 |
| $C_{2}$ | 0.7356 |
| $C_{3}$ | -0.7434 |
| $C_{4}$ | -1.3930 |
| $C_{5}$ | 1.2818 |
| $C_{6}$ | -1.1033 |
| $C_{7}$ | -0.2523 |
| $C_{8}$ | -0.7905 |
| $C_{9}$ | -0.4261 |
| $C_{10}$ | -0.9390 |
| $C_{11}$ | 0.4345 |
| $C_{12}$ | 0.4433 |
| $C_{13}$ | -0.3076 |
| $C_{14}$ | 0.5644 |
| $C_{15}$ | 0.2571 |
| $C_{16}$ | -1.0030 |
| $C_{17}$ | -0.7820 |
| $C_{18}$ | -0.4064 |
| $C_{19}$ | 0.9034 |
| $C_{20}$ | 1.5406 |
| $C_{21}$ | -1.4613 |
| $C_{22}$ | 1.2745 |
| $C_{23}$ | 0.3715 |
| $C_{24}$ | 1.8134 |
| $C_{25}$ | 0.9438 |
| $C_{26}$ | 1.3130 |
| $C_{27}$ | -1.3070 |
| $C_{28}$ | -1.3462 |
| $C_{29}$ | 1.6868 |
| $C_{30}$ | -1.2153 |
| $C_{31}$ | -0.6778 |
| $C_{32}$ | -1.2385 |
| $C_{33}$ | -0.7883 |
| $C_{34}$ | -0.7954 |
| $C_{35}$ | 1.0874 |
| $C_{36}$ | 1.1491 |
| $C_{37}$ | -1.4780 |
| $C_{38}$ | 0.8870 |
| $C_{39}$ | 0.4694 |
| $C_{40}$ | 1.5066 |
| $C_{41}$ | 1.1266 |
| $C_{42}$ | 0.9935 |
| $C_{43}$ | -1.2462 |

TABLE 4-continued

Time-domain packet synchronization sequence four

| Sequence Element | Value |
|---|---|
| $C_{44}$ | -1.7869 |
| $C_{45}$ | 1.7462 |
| $C_{46}$ | -1.4881 |
| $C_{47}$ | -0.4090 |
| $C_{48}$ | -1.4694 |
| $C_{49}$ | -0.7923 |
| $C_{50}$ | -1.4607 |
| $C_{51}$ | 0.9113 |
| $C_{52}$ | 0.8454 |
| $C_{53}$ | -0.8866 |
| $C_{54}$ | 0.8852 |
| $C_{55}$ | 0.4918 |
| $C_{56}$ | -0.6096 |
| $C_{57}$ | -0.4321 |
| $C_{58}$ | -0.1327 |
| $C_{59}$ | 0.4953 |
| $C_{60}$ | 0.9702 |
| $C_{61}$ | -0.8667 |
| $C_{62}$ | 0.6803 |
| $C_{63}$ | -0.0244 |
| $C_{64}$ | 1.3095 |
| $C_{65}$ | 0.6675 |
| $C_{66}$ | 1.2587 |
| $C_{67}$ | -0.9993 |
| $C_{68}$ | -1.0052 |
| $C_{69}$ | 0.6601 |
| $C_{70}$ | -1.0228 |
| $C_{71}$ | -0.7489 |
| $C_{72}$ | 0.5086 |
| $C_{73}$ | 0.1563 |
| $C_{74}$ | 0.0673 |
| $C_{75}$ | -0.8375 |
| $C_{76}$ | -1.0746 |
| $C_{77}$ | 0.4454 |
| $C_{78}$ | -0.7831 |
| $C_{79}$ | -0.3623 |
| $C_{80}$ | -1.3658 |
| $C_{81}$ | -1.0854 |
| $C_{82}$ | -1.4923 |
| $C_{83}$ | 0.4233 |
| $C_{84}$ | 0.6741 |
| $C_{85}$ | -1.0157 |
| $C_{86}$ | 0.8304 |
| $C_{87}$ | 0.4878 |
| $C_{88}$ | -1.4992 |
| $C_{89}$ | -1.1884 |
| $C_{90}$ | -1.4008 |
| $C_{91}$ | 0.7795 |
| $C_{92}$ | 1.2926 |
| $C_{93}$ | -1.2049 |
| $C_{94}$ | 1.2934 |
| $C_{95}$ | 0.8123 |
| $C_{96}$ | -1.0094 |
| $C_{97}$ | -0.7598 |
| $C_{98}$ | -1.0786 |
| $C_{99}$ | 0.6699 |
| $C_{100}$ | 0.9813 |
| $C_{101}$ | -0.5563 |
| $C_{102}$ | 1.0548 |
| $C_{103}$ | 0.8925 |
| $C_{104}$ | -1.3656 |
| $C_{105}$ | -0.8472 |
| $C_{106}$ | -1.3110 |
| $C_{107}$ | 1.1897 |
| $C_{108}$ | 1.5127 |
| $C_{109}$ | -0.7474 |
| $C_{110}$ | 1.4678 |
| $C_{111}$ | 1.0295 |
| $C_{112}$ | -0.9210 |
| $C_{113}$ | -0.4784 |
| $C_{114}$ | -0.5022 |
| $C_{115}$ | 1.2153 |
| $C_{116}$ | 1.5783 |
| $C_{117}$ | -0.7718 |

TABLE 4-continued

Time-domain packet synchronization sequence four

| Sequence Element | Value |
|---|---|
| $C_{118}$ | 1.2384 |
| $C_{119}$ | 0.6695 |
| $C_{120}$ | 0.8821 |
| $C_{121}$ | 0.7807 |
| $C_{122}$ | 1.0537 |
| $C_{123}$ | −0.0791 |
| $C_{124}$ | −0.2845 |
| $C_{125}$ | 0.5790 |
| $C_{126}$ | −0.4664 |
| $C_{127}$ | −0.1097 |

TABLE 5

Four M-length sequences, M = 16

| Sequence Number | Sequence A |
|---|---|
| 1 | 1  1  1  1  −1  −1  1  1  −1  −1  1  −1  1  −1  1  1 |
| 2 | 1  −1  −1  −1  −1  −1  1  −1  1  −1  −1  1  1  −1  −1  1 |
| 3 | 1  1  −1  −1  −1  1  −1  −1  −1  1  −1  −1  1  −1  1  1 |
| 4 | 1  −1  −1  1  −1  1  −1  −1  1  1  −1  −1  −1  −1  −1  1 |

TABLE 6

Four N-length sequences, N = 8

| Sequence Number | Sequence B |
|---|---|
| 1 | 1  −1  −1  −1  1  1  −1  1 |
| 2 | 1  −1  1  1  −1  −1  −1  1 |
| 3 | 1  1  −1  1  1  −1  −1  −1 |
| 4 | 1  1  1  −1  −1  1  −1  −1 |

TABLE 7

Time-domain packet synchronization sequence five

| Sequence Element | Value |
|---|---|
| $C_0$ | 1 |
| $C_1$ | −1 |
| $C_2$ | −1 |
| $C_3$ | −1 |
| $C_4$ | 1 |
| $C_5$ | 1 |
| $C_6$ | −1 |
| $C_7$ | 1 |
| $C_8$ | 1 |
| $C_9$ | −1 |
| $C_{10}$ | −1 |
| $C_{11}$ | −1 |
| $C_{12}$ | 1 |
| $C_{13}$ | 1 |
| $C_{14}$ | −1 |
| $C_{15}$ | 1 |
| $C_{16}$ | 1 |
| $C_{17}$ | −1 |
| $C_{18}$ | −1 |
| $C_{19}$ | −1 |
| $C_{20}$ | 1 |
| $C_{21}$ | 1 |
| $C_{22}$ | −1 |

TABLE 7-continued

Time-domain packet synchronization sequence five

| Sequence Element | Value |
|---|---|
| $C_{23}$ | 1 |
| $C_{24}$ | 1 |
| $C_{25}$ | −1 |
| $C_{26}$ | −1 |
| $C_{27}$ | −1 |
| $C_{28}$ | 1 |
| $C_{29}$ | 1 |
| $C_{30}$ | −1 |
| $C_{31}$ | 1 |
| $C_{32}$ | −1 |
| $C_{33}$ | 1 |
| $C_{34}$ | 1 |
| $C_{35}$ | 1 |
| $C_{36}$ | −1 |
| $C_{37}$ | −1 |
| $C_{38}$ | 1 |
| $C_{39}$ | −1 |
| $C_{40}$ | −1 |
| $C_{41}$ | 1 |
| $C_{42}$ | 1 |
| $C_{43}$ | 1 |
| $C_{44}$ | −1 |
| $C_{45}$ | −1 |
| $C_{46}$ | 1 |
| $C_{47}$ | −1 |
| $C_{48}$ | 1 |
| $C_{49}$ | −1 |
| $C_{50}$ | −1 |
| $C_{51}$ | −1 |
| $C_{52}$ | 1 |
| $C_{53}$ | 1 |
| $C_{54}$ | −1 |
| $C_{55}$ | 1 |
| $C_{56}$ | 1 |
| $C_{57}$ | −1 |
| $C_{58}$ | −1 |
| $C_{59}$ | −1 |
| $C_{60}$ | 1 |
| $C_{61}$ | 1 |
| $C_{62}$ | −1 |
| $C_{63}$ | 1 |
| $C_{64}$ | −1 |
| $C_{65}$ | 1 |
| $C_{66}$ | 1 |
| $C_{67}$ | 1 |
| $C_{68}$ | −1 |
| $C_{69}$ | −1 |
| $C_{70}$ | 1 |

TABLE 7-continued

Time-domain packet synchronization sequence five

| Sequence Element | Value |
| --- | --- |
| $C_{71}$ | −1 |
| $C_{72}$ | −1 |
| $C_{73}$ | 1 |
| $C_{74}$ | 1 |
| $C_{75}$ | 1 |
| $C_{76}$ | −1 |
| $C_{77}$ | −1 |
| $C_{78}$ | 1 |
| $C_{79}$ | −1 |
| $C_{80}$ | 1 |
| $C_{81}$ | −1 |
| $C_{82}$ | −1 |
| $C_{83}$ | −1 |
| $C_{84}$ | 1 |
| $C_{85}$ | 1 |
| $C_{86}$ | −1 |
| $C_{87}$ | 1 |
| $C_{88}$ | −1 |
| $C_{89}$ | 1 |
| $C_{90}$ | 1 |
| $C_{91}$ | 1 |
| $C_{92}$ | −1 |
| $C_{93}$ | −1 |
| $C_{94}$ | 1 |
| $C_{95}$ | −1 |
| $C_{96}$ | 1 |
| $C_{97}$ | −1 |
| $C_{98}$ | −1 |
| $C_{99}$ | −1 |
| $C_{100}$ | 1 |
| $C_{101}$ | 1 |
| $C_{102}$ | −1 |
| $C_{103}$ | 1 |
| $C_{104}$ | −1 |
| $C_{105}$ | 1 |
| $C_{106}$ | 1 |
| $C_{107}$ | 1 |
| $C_{108}$ | −1 |
| $C_{109}$ | −1 |
| $C_{110}$ | 1 |
| $C_{111}$ | −1 |
| $C_{112}$ | 1 |
| $C_{113}$ | −1 |
| $C_{114}$ | −1 |
| $C_{115}$ | −1 |
| $C_{116}$ | 1 |
| $C_{117}$ | 1 |
| $C_{118}$ | −1 |
| $C_{119}$ | 1 |
| $C_{120}$ | 1 |
| $C_{121}$ | −1 |
| $C_{122}$ | −1 |
| $C_{123}$ | −1 |
| $C_{124}$ | 1 |
| $C_{125}$ | 1 |
| $C_{126}$ | −1 |
| $C_{127}$ | 1 |

TABLE 8

Time-domain packet synchronization sequence six

| Sequence Element | Value |
| --- | --- |
| $C_0$ | 1 |
| $C_1$ | −1 |
| $C_2$ | 1 |
| $C_3$ | 1 |
| $C_4$ | −1 |
| $C_5$ | −1 |
| $C_6$ | −1 |
| $C_7$ | 1 |
| $C_8$ | −1 |
| $C_9$ | 1 |
| $C_{10}$ | −1 |
| $C_{11}$ | −1 |
| $C_{12}$ | 1 |
| $C_{13}$ | 1 |
| $C_{14}$ | 1 |
| $C_{15}$ | −1 |
| $C_{16}$ | −1 |
| $C_{17}$ | 1 |
| $C_{18}$ | −1 |
| $C_{19}$ | −1 |
| $C_{20}$ | 1 |
| $C_{21}$ | 1 |
| $C_{22}$ | 1 |
| $C_{23}$ | −1 |
| $C_{24}$ | −1 |
| $C_{25}$ | 1 |
| $C_{26}$ | −1 |
| $C_{27}$ | −1 |
| $C_{28}$ | 1 |
| $C_{29}$ | 1 |
| $C_{30}$ | 1 |
| $C_{31}$ | −1 |
| $C_{32}$ | −1 |
| $C_{33}$ | 1 |
| $C_{34}$ | −1 |
| $C_{35}$ | −1 |
| $C_{36}$ | 1 |
| $C_{37}$ | 1 |
| $C_{38}$ | 1 |
| $C_{39}$ | −1 |
| $C_{40}$ | −1 |
| $C_{41}$ | 1 |
| $C_{42}$ | −1 |
| $C_{43}$ | −1 |
| $C_{44}$ | 1 |
| $C_{45}$ | 1 |
| $C_{46}$ | 1 |
| $C_{47}$ | −1 |
| $C_{48}$ | 1 |
| $C_{49}$ | −1 |
| $C_{50}$ | 1 |
| $C_{51}$ | 1 |
| $C_{52}$ | −1 |
| $C_{53}$ | −1 |
| $C_{54}$ | −1 |
| $C_{55}$ | 1 |
| $C_{56}$ | −1 |
| $C_{57}$ | 1 |
| $C_{58}$ | −1 |
| $C_{59}$ | −1 |
| $C_{60}$ | 1 |
| $C_{61}$ | 1 |
| $C_{62}$ | 1 |
| $C_{63}$ | −1 |
| $C_{64}$ | 1 |
| $C_{65}$ | −1 |
| $C_{66}$ | 1 |
| $C_{67}$ | 1 |
| $C_{68}$ | −1 |
| $C_{69}$ | −1 |
| $C_{70}$ | −1 |
| $C_{71}$ | 1 |
| $C_{72}$ | −1 |
| $C_{73}$ | 1 |
| $C_{74}$ | −1 |
| $C_{75}$ | −1 |
| $C_{76}$ | 1 |
| $C_{77}$ | 1 |
| $C_{78}$ | 1 |
| $C_{79}$ | −1 |

TABLE 8-continued

Time-domain packet synchronization sequence six

| Sequence Element | Value |
|---|---|
| $C_{80}$ | −1 |
| $C_{81}$ | 1 |
| $C_{82}$ | −1 |
| $C_{83}$ | −1 |
| $C_{84}$ | 1 |
| $C_{85}$ | 1 |
| $C_{86}$ | 1 |
| $C_{87}$ | −1 |
| $C_{88}$ | 1 |
| $C_{89}$ | −1 |
| $C_{90}$ | 1 |
| $C_{91}$ | 1 |
| $C_{92}$ | −1 |
| $C_{93}$ | −1 |
| $C_{94}$ | −1 |
| $C_{95}$ | 1 |
| $C_{96}$ | 1 |
| $C_{97}$ | −1 |
| $C_{98}$ | 1 |
| $C_{99}$ | 1 |
| $C_{100}$ | −1 |
| $C_{101}$ | −1 |
| $C_{102}$ | −1 |
| $C_{103}$ | 1 |
| $C_{104}$ | −1 |
| $C_{105}$ | 1 |
| $C_{106}$ | −1 |
| $C_{107}$ | −1 |
| $C_{108}$ | 1 |
| $C_{109}$ | 1 |
| $C_{110}$ | 1 |
| $C_{111}$ | −1 |
| $C_{112}$ | −1 |
| $C_{113}$ | 1 |
| $C_{114}$ | −1 |
| $C_{115}$ | −1 |
| $C_{116}$ | 1 |
| $C_{117}$ | 1 |
| $C_{118}$ | 1 |
| $C_{119}$ | −1 |
| $C_{120}$ | 1 |
| $C_{121}$ | −1 |
| $C_{122}$ | 1 |
| $C_{123}$ | 1 |
| $C_{124}$ | −1 |
| $C_{125}$ | −1 |
| $C_{126}$ | −1 |
| $C_{127}$ | 1 |

TABLE 9

Time-domain packet synchronization sequence seven

| Sequence Element | Value |
|---|---|
| $C_0$ | 1 |
| $C_1$ | 1 |
| $C_2$ | −1 |
| $C_3$ | 1 |
| $C_4$ | 1 |
| $C_5$ | −1 |
| $C_6$ | −1 |
| $C_7$ | −1 |
| $C_8$ | 1 |
| $C_9$ | 1 |
| $C_{10}$ | −1 |
| $C_{11}$ | 1 |
| $C_{12}$ | 1 |
| $C_{13}$ | −1 |
| $C_{14}$ | −1 |

TABLE 9-continued

Time-domain packet synchronization sequence seven

| Sequence Element | Value |
|---|---|
| $C_{15}$ | −1 |
| $C_{16}$ | −1 |
| $C_{17}$ | −1 |
| $C_{18}$ | 1 |
| $C_{19}$ | −1 |
| $C_{20}$ | −1 |
| $C_{21}$ | 1 |
| $C_{22}$ | 1 |
| $C_{23}$ | 1 |
| $C_{24}$ | −1 |
| $C_{25}$ | −1 |
| $C_{26}$ | 1 |
| $C_{27}$ | −1 |
| $C_{28}$ | −1 |
| $C_{29}$ | 1 |
| $C_{30}$ | 1 |
| $C_{31}$ | 1 |
| $C_{32}$ | −1 |
| $C_{33}$ | −1 |
| $C_{34}$ | 1 |
| $C_{35}$ | −1 |
| $C_{36}$ | −1 |
| $C_{37}$ | 1 |
| $C_{38}$ | 1 |
| $C_{39}$ | 1 |
| $C_{40}$ | 1 |
| $C_{41}$ | 1 |
| $C_{42}$ | −1 |
| $C_{43}$ | 1 |
| $C_{44}$ | 1 |
| $C_{45}$ | −1 |
| $C_{46}$ | −1 |
| $C_{47}$ | −1 |
| $C_{48}$ | −1 |
| $C_{49}$ | −1 |
| $C_{50}$ | 1 |
| $C_{51}$ | −1 |
| $C_{52}$ | −1 |
| $C_{53}$ | 1 |
| $C_{54}$ | 1 |
| $C_{55}$ | 1 |
| $C_{56}$ | −1 |
| $C_{57}$ | −1 |
| $C_{58}$ | 1 |
| $C_{59}$ | −1 |
| $C_{60}$ | −1 |
| $C_{61}$ | 1 |
| $C_{62}$ | 1 |
| $C_{63}$ | 1 |
| $C_{64}$ | −1 |
| $C_{65}$ | −1 |
| $C_{66}$ | 1 |
| $C_{67}$ | −1 |
| $C_{68}$ | −1 |
| $C_{69}$ | 1 |
| $C_{70}$ | 1 |
| $C_{71}$ | 1 |
| $C_{72}$ | 1 |
| $C_{73}$ | 1 |
| $C_{74}$ | −1 |
| $C_{75}$ | 1 |
| $C_{76}$ | 1 |
| $C_{77}$ | −1 |
| $C_{78}$ | −1 |
| $C_{79}$ | −1 |
| $C_{80}$ | −1 |
| $C_{81}$ | −1 |
| $C_{82}$ | 1 |
| $C_{83}$ | −1 |
| $C_{84}$ | −1 |
| $C_{85}$ | 1 |
| $C_{86}$ | 1 |
| $C_{87}$ | 1 |
| $C_{88}$ | −1 |

TABLE 9-continued

Time-domain packet synchronization sequence seven

| Sequence Element | Value |
|---|---|
| $C_{89}$ | −1 |
| $C_{90}$ | 1 |
| $C_{91}$ | −1 |
| $C_{92}$ | −1 |
| $C_{93}$ | 1 |
| $C_{94}$ | 1 |
| $C_{95}$ | 1 |
| $C_{96}$ | 1 |
| $C_{97}$ | 1 |
| $C_{98}$ | −1 |
| $C_{99}$ | 1 |
| $C_{100}$ | 1 |
| $C_{101}$ | −1 |
| $C_{102}$ | −1 |
| $C_{103}$ | −1 |
| $C_{104}$ | −1 |
| $C_{105}$ | −1 |
| $C_{106}$ | 1 |
| $C_{107}$ | −1 |
| $C_{108}$ | −1 |
| $C_{109}$ | 1 |
| $C_{110}$ | 1 |
| $C_{111}$ | 1 |
| $C_{112}$ | 1 |
| $C_{113}$ | 1 |
| $C_{114}$ | −1 |
| $C_{115}$ | 1 |
| $C_{116}$ | 1 |
| $C_{117}$ | −1 |
| $C_{118}$ | −1 |
| $C_{119}$ | −1 |
| $C_{120}$ | 1 |
| $C_{121}$ | 1 |
| $C_{122}$ | −1 |
| $C_{123}$ | 1 |
| $C_{124}$ | 1 |
| $C_{125}$ | −1 |
| $C_{126}$ | −1 |
| $C_{127}$ | −1 |

TABLE 10

Time-domain packet synchronization sequence eight

| Sequence Element | Value |
|---|---|
| $C_0$ | 1 |
| $C_1$ | 1 |
| $C_2$ | 1 |
| $C_3$ | −1 |
| $C_4$ | −1 |
| $C_5$ | 1 |
| $C_6$ | −1 |
| $C_7$ | −1 |
| $C_8$ | −1 |
| $C_9$ | −1 |
| $C_{10}$ | −1 |
| $C_{11}$ | 1 |
| $C_{12}$ | 1 |
| $C_{13}$ | −1 |
| $C_{14}$ | 1 |
| $C_{15}$ | 1 |
| $C_{16}$ | −1 |
| $C_{17}$ | −1 |
| $C_{18}$ | −1 |
| $C_{19}$ | 1 |
| $C_{20}$ | 1 |
| $C_{21}$ | −1 |
| $C_{22}$ | 1 |
| $C_{23}$ | 1 |

TABLE 10-continued

Time-domain packet synchronization sequence eight

| Sequence Element | Value |
|---|---|
| $C_{24}$ | 1 |
| $C_{25}$ | 1 |
| $C_{26}$ | 1 |
| $C_{27}$ | −1 |
| $C_{28}$ | −1 |
| $C_{29}$ | 1 |
| $C_{30}$ | −1 |
| $C_{31}$ | −1 |
| $C_{32}$ | −1 |
| $C_{33}$ | −1 |
| $C_{34}$ | −1 |
| $C_{35}$ | 1 |
| $C_{36}$ | 1 |
| $C_{37}$ | −1 |
| $C_{38}$ | 1 |
| $C_{39}$ | 1 |
| $C_{40}$ | 1 |
| $C_{41}$ | 1 |
| $C_{42}$ | 1 |
| $C_{43}$ | −1 |
| $C_{44}$ | −1 |
| $C_{45}$ | 1 |
| $C_{46}$ | −1 |
| $C_{47}$ | −1 |
| $C_{48}$ | −1 |
| $C_{49}$ | −1 |
| $C_{50}$ | −1 |
| $C_{51}$ | 1 |
| $C_{52}$ | 1 |
| $C_{53}$ | −1 |
| $C_{54}$ | 1 |
| $C_{55}$ | 1 |
| $C_{56}$ | −1 |
| $C_{57}$ | −1 |
| $C_{58}$ | −1 |
| $C_{59}$ | 1 |
| $C_{60}$ | 1 |
| $C_{61}$ | −1 |
| $C_{62}$ | 1 |
| $C_{63}$ | 1 |
| $C_{64}$ | 1 |
| $C_{65}$ | 1 |
| $C_{66}$ | 1 |
| $C_{67}$ | −1 |
| $C_{68}$ | −1 |
| $C_{69}$ | 1 |
| $C_{70}$ | −1 |
| $C_{71}$ | −1 |
| $C_{72}$ | 1 |
| $C_{73}$ | 1 |
| $C_{74}$ | 1 |
| $C_{75}$ | −1 |
| $C_{76}$ | −1 |
| $C_{77}$ | 1 |
| $C_{78}$ | −1 |
| $C_{79}$ | −1 |
| $C_{80}$ | −1 |
| $C_{81}$ | −1 |
| $C_{82}$ | −1 |
| $C_{83}$ | 1 |
| $C_{84}$ | 1 |
| $C_{85}$ | −1 |
| $C_{86}$ | 1 |
| $C_{87}$ | 1 |
| $C_{88}$ | −1 |
| $C_{89}$ | −1 |
| $C_{90}$ | −1 |
| $C_{91}$ | 1 |
| $C_{92}$ | 1 |
| $C_{93}$ | −1 |
| $C_{94}$ | 1 |
| $C_{95}$ | 1 |
| $C_{96}$ | −1 |
| $C_{97}$ | −1 |

TABLE 10-continued

Time-domain packet synchronization sequence eight

| Sequence Element | Value |
| --- | --- |
| $C_{98}$ | −1 |
| $C_{99}$ | 1 |
| $C_{100}$ | 1 |
| $C_{101}$ | −1 |
| $C_{102}$ | 1 |
| $C_{103}$ | 1 |
| $C_{104}$ | −1 |
| $C_{105}$ | −1 |
| $C_{106}$ | −1 |
| $C_{107}$ | 1 |
| $C_{108}$ | 1 |
| $C_{109}$ | −1 |
| $C_{110}$ | 1 |
| $C_{111}$ | 1 |
| $C_{112}$ | −1 |
| $C_{113}$ | −1 |
| $C_{114}$ | −1 |
| $C_{115}$ | 1 |
| $C_{116}$ | 1 |
| $C_{117}$ | −1 |
| $C_{118}$ | 1 |
| $C_{119}$ | 1 |
| $C_{120}$ | 1 |
| $C_{121}$ | 1 |
| $C_{122}$ | 1 |
| $C_{123}$ | −1 |
| $C_{124}$ | −1 |
| $C_{125}$ | 1 |
| $C_{126}$ | −1 |
| $C_{127}$ | −1 |

TABLE 11

Frequency-domain OFDM training sequence one.

| Tone Number | Value |
| --- | --- |
| −56 | $(1 - j)/\sqrt{2}$ |
| −55 | $(-1 + j)/\sqrt{2}$ |
| −54 | $(-1 + j)/\sqrt{2}$ |
| −53 | $(1 - j)/\sqrt{2}$ |
| −52 | $(1 - j)/\sqrt{2}$ |
| −51 | $(1 - j)/\sqrt{2}$ |
| −50 | $(-1 + j)/\sqrt{2}$ |
| −49 | $(1 - j)/\sqrt{2}$ |
| −48 | $(-1 + j)/\sqrt{2}$ |
| −47 | $(-1 + j)/\sqrt{2}$ |
| −46 | $(-1 + j)/\sqrt{2}$ |
| −45 | $(1 - j)/\sqrt{2}$ |
| −44 | $(-1 + j)/\sqrt{2}$ |
| −43 | $(-1 + j)/\sqrt{2}$ |
| −42 | $(-1 + j)/\sqrt{2}$ |
| −41 | $(-1 + j)/\sqrt{2}$ |
| −40 | $(-1 + j)/\sqrt{2}$ |
| −39 | $(-1 + j)/\sqrt{2}$ |
| −38 | $(1 - j)/\sqrt{2}$ |
| −37 | $(-1 + j)/\sqrt{2}$ |
| −36 | $(1 - j)/\sqrt{2}$ |
| −35 | $(-1 + j)/\sqrt{2}$ |
| −34 | $(-1 + j)/\sqrt{2}$ |
| −33 | $(-1 + j)/\sqrt{2}$ |
| −32 | $(1 - j)/\sqrt{2}$ |
| −31 | $(-1 + j)/\sqrt{2}$ |
| −30 | $(-1 + j)/\sqrt{2}$ |
| −29 | $(1 - j)/\sqrt{2}$ |
| −28 | $(1 - j)/\sqrt{2}$ |
| −27 | $(1 - j)/\sqrt{2}$ |
| −26 | $(-1 + j)/\sqrt{2}$ |
| −25 | $(-1 + j)/\sqrt{2}$ |
| −24 | $(-1 + j)/\sqrt{2}$ |
| −23 | $(1 - j)/\sqrt{2}$ |
| −22 | $(-1 + j)/\sqrt{2}$ |
| −21 | $(-1 + j)/\sqrt{2}$ |
| −20 | $(1 - j)/\sqrt{2}$ |
| −19 | $(-1 + j)/\sqrt{2}$ |
| −18 | $(-1 + j)/\sqrt{2}$ |
| −17 | $(-1 + j)/\sqrt{2}$ |
| −16 | $(-1 + j)/\sqrt{2}$ |
| −15 | $(1 - j)/\sqrt{2}$ |
| −14 | $(-1 + j)/\sqrt{2}$ |
| −13 | $(1 - j)/\sqrt{2}$ |
| −12 | $(-1 + j)/\sqrt{2}$ |
| −11 | $(1 - j)/\sqrt{2}$ |
| −10 | $(1 - j)/\sqrt{2}$ |
| −9 | $(1 - j)/\sqrt{2}$ |
| −8 | $(-1 + j)/\sqrt{2}$ |
| −7 | $(-1 + j)/\sqrt{2}$ |
| −6 | $(-1 + j)/\sqrt{2}$ |
| −5 | $(-1 + j)/\sqrt{2}$ |
| −4 | $(-1 + j)/\sqrt{2}$ |
| −3 | $(1 - j)/\sqrt{2}$ |
| −2 | $(-1 + j)/\sqrt{2}$ |
| −1 | $(1 - j)/\sqrt{2}$ |
| 1 | $(1 + j)/\sqrt{2}$ |
| 2 | $-(1 + j)/\sqrt{2}$ |
| 3 | $(1 + j)/\sqrt{2}$ |
| 4 | $-(1 + j)/\sqrt{2}$ |
| 5 | $-(1 + j)/\sqrt{2}$ |
| 6 | $-(1 + j)/\sqrt{2}$ |
| 7 | $-(1 + j)/\sqrt{2}$ |
| 8 | $-(1 + j)/\sqrt{2}$ |
| 9 | $(1 + j)/\sqrt{2}$ |
| 10 | $(1 + j)/\sqrt{2}$ |
| 11 | $(1 + j)/\sqrt{2}$ |
| 12 | $-(1 + j)/\sqrt{2}$ |
| 13 | $(1 + j)/\sqrt{2}$ |
| 14 | $-(1 + j)/\sqrt{2}$ |
| 15 | $(1 + j)/\sqrt{2}$ |
| 16 | $-(1 + j)/\sqrt{2}$ |
| 17 | $-(1 + j)/\sqrt{2}$ |
| 18 | $-(1 + j)/\sqrt{2}$ |
| 19 | $-(1 + j)/\sqrt{2}$ |
| 20 | $(1 + j)/\sqrt{2}$ |
| 21 | $-(1 + j)/\sqrt{2}$ |
| 22 | $-(1 + j)/\sqrt{2}$ |
| 23 | $(1 + j)/\sqrt{2}$ |
| 24 | $-(1 + j)/\sqrt{2}$ |
| 25 | $-(1 + j)/\sqrt{2}$ |
| 26 | $-(1 + j)/\sqrt{2}$ |
| 27 | $(1 + j)/\sqrt{2}$ |
| 28 | $(1 + j)/\sqrt{2}$ |
| 29 | $(1 + j)/\sqrt{2}$ |
| 30 | $-(1 + j)/\sqrt{2}$ |
| 31 | $-(1 + j)/\sqrt{2}$ |
| 32 | $(1 + j)/\sqrt{2}$ |
| 33 | $-(1 + j)/\sqrt{2}$ |
| 34 | $-(1 + j)/\sqrt{2}$ |
| 35 | $-(1 + j)/\sqrt{2}$ |
| 36 | $(1 + j)/\sqrt{2}$ |
| 37 | $-(1 + j)/\sqrt{2}$ |
| 38 | $(1 + j)/\sqrt{2}$ |
| 39 | $-(1 + j)/\sqrt{2}$ |
| 40 | $-(1 + j)/\sqrt{2}$ |
| 41 | $-(1 + j)/\sqrt{2}$ |
| 42 | $-(1 + j)/\sqrt{2}$ |
| 43 | $-(1 + j)/\sqrt{2}$ |
| 44 | $-(1 + j)/\sqrt{2}$ |
| 45 | $(1 + j)/\sqrt{2}$ |
| 46 | $-(1 + j)/\sqrt{2}$ |
| 47 | $-(1 + j)/\sqrt{2}$ |
| 48 | $-(1 + j)/\sqrt{2}$ |
| 49 | $(1 + j)/\sqrt{2}$ |
| 50 | $-(1 + j)/\sqrt{2}$ |
| 51 | $(1 + j)/\sqrt{2}$ |

TABLE 11-continued

Frequency-domain OFDM training sequence one.

| Tone Number | Value |
|---|---|
| 52 | $(1 + j)/\sqrt{2}$ |
| 53 | $(1 + j)/\sqrt{2}$ |
| 54 | $-(1 + j)/\sqrt{2}$ |
| 55 | $-(1 + j)/\sqrt{2}$ |
| 56 | $(1 + j)/\sqrt{2}$ |

TABLE 12

Frequency-domain OFDM training sequence two

| Tone Number | Value |
|---|---|
| −56 | 1 |
| −55 | −1 |
| −54 | −1 |
| −53 | 1 |
| −52 | −1 |
| −51 | −1 |
| −50 | 1 |
| −49 | 1 |
| −48 | −1 |
| −47 | 1 |
| −46 | −1 |
| −45 | −1 |
| −44 | −1 |
| −43 | 1 |
| −42 | −1 |
| −41 | 1 |
| −40 | 1 |
| −39 | −1 |
| −38 | −1 |
| −37 | −1 |
| −36 | 1 |
| −35 | −1 |
| −34 | −1 |
| −33 | −1 |
| −32 | 1 |
| −31 | 1 |
| −30 | 1 |
| −29 | 1 |
| −28 | 1 |
| −27 | −1 |
| −26 | 1 |
| −25 | 1 |
| −24 | 1 |
| −23 | −1 |
| −22 | 1 |
| −21 | −1 |
| −20 | 1 |
| −19 | −1 |
| −18 | −1 |
| −17 | 1 |
| −16 | −1 |
| −15 | −1 |
| −14 | −1 |
| −13 | 1 |
| −12 | 1 |
| −11 | −1 |
| −10 | 1 |
| −9 | 1 |
| −8 | 1 |
| −7 | −1 |
| −6 | −1 |
| −5 | 1 |
| −4 | 1 |
| −3 | 1 |
| −2 | 1 |
| −1 | 1 |
| 1 | 1 |
| 2 | 1 |

TABLE 12-continued

Frequency-domain OFDM training sequence two

| Tone Number | Value |
|---|---|
| 3 | 1 |
| 4 | 1 |
| 5 | 1 |
| 6 | −1 |
| 7 | −1 |
| 8 | 1 |
| 9 | 1 |
| 10 | 1 |
| 11 | −1 |
| 12 | 1 |
| 13 | 1 |
| 14 | −1 |
| 15 | −1 |
| 16 | −1 |
| 17 | 1 |
| 18 | −1 |
| 19 | −1 |
| 20 | 1 |
| 21 | −1 |
| 22 | 1 |
| 23 | −1 |
| 24 | 1 |
| 25 | 1 |
| 26 | 1 |
| 27 | −1 |
| 28 | 1 |
| 29 | 1 |
| 30 | 1 |
| 31 | 1 |
| 32 | 1 |
| 33 | −1 |
| 34 | −1 |
| 35 | −1 |
| 36 | 1 |
| 37 | −1 |
| 38 | −1 |
| 39 | −1 |
| 40 | 1 |
| 41 | 1 |
| 42 | −1 |
| 43 | 1 |
| 44 | −1 |
| 45 | −1 |
| 46 | −1 |
| 47 | 1 |
| 48 | −1 |
| 49 | 1 |
| 50 | 1 |
| 51 | −1 |
| 52 | −1 |
| 53 | 1 |
| 54 | −1 |
| 55 | −1 |
| 56 | 1 |

What is claimed is:

1. A transceiver for a wireless communications system comprising:
   a transmitter comprising preamble transmission circuitry;
   a memory storing a preamble, the preamble comprising
      a first sequence wherein the first sequence comprises a concatenation of a first set of sub-sequences, with each sub-sequence containing a specified number of zeroes, and wherein each sub-sequence can differ depending upon its position in the preamble; and
      a second sequence wherein the second sequence comprises a concatenation of a second set of sub-sequences, wherein the second set of sub-sequences differ from the first set of sub-sequences, wherein the second sequence comprises a concatenation of multiple copies of a frequency domain sequence.

2. The transceiver of claim 1, wherein the sub-sequences are specified in the time domain.

3. The transceiver of claim 1, wherein the frequency domain sequence is converted into a time domain sequence prior to use in creating the second sequence.

4. The transceiver of claim 3, wherein the second sequence comprises six (6) copies of the time domain sequence version of the frequency domain sequence.

5. The transceiver of claim 1, wherein the frequency domain sequence specifies Tone Number and Value as follows:

| Tone Number | Value |
|---|---|
| −56 | $(1-j)/\sqrt{2}$ |
| −55 | $(-1+j)/\sqrt{2}$ |
| −54 | $(-1+j)/\sqrt{2}$ |
| −53 | $(1-j)/\sqrt{2}$ |
| −52 | $(1-j)/\sqrt{2}$ |
| −51 | $(1-j)/\sqrt{2}$ |
| −50 | $(-1+j)/\sqrt{2}$ |
| −49 | $(1-j)/\sqrt{2}$ |
| −48 | $(-1+j)/\sqrt{2}$ |
| −47 | $(-1+j)/\sqrt{2}$ |
| −46 | $(-1+j)/\sqrt{2}$ |
| −45 | $(1-j)/\sqrt{2}$ |
| −44 | $(-1+j)/\sqrt{2}$ |
| −43 | $(-1+j)/\sqrt{2}$ |
| −42 | $(-1+j)/\sqrt{2}$ |
| −41 | $(-1+j)/\sqrt{2}$ |
| −40 | $(-1+j)/\sqrt{2}$ |
| −39 | $(-1+j)/\sqrt{2}$ |
| −38 | $(1-j)/\sqrt{2}$ |
| −37 | $(-1+j)/\sqrt{2}$ |
| −36 | $(1-j)/\sqrt{2}$ |
| −35 | $(-1+j)/\sqrt{2}$ |
| −34 | $(-1+j)/\sqrt{2}$ |
| −33 | $(-1+j)/\sqrt{2}$ |
| −32 | $(1-j)/\sqrt{2}$ |
| −31 | $(-1+j)/\sqrt{2}$ |
| −30 | $(-1+j)/\sqrt{2}$ |
| −29 | $(1-j)/\sqrt{2}$ |
| −28 | $(1-j)/\sqrt{2}$ |
| −27 | $(1-j)/\sqrt{2}$ |
| −26 | $(-1+j)/\sqrt{2}$ |
| −25 | $(-1+j)/\sqrt{2}$ |
| −24 | $(-1+j)/\sqrt{2}$ |
| −23 | $(1-j)/\sqrt{2}$ |
| −22 | $(-1+j)/\sqrt{2}$ |
| −21 | $(-1+j)/\sqrt{2}$ |
| −20 | $(1-j)/\sqrt{2}$ |
| −19 | $(-1+j)/\sqrt{2}$ |
| −18 | $(-1+j)/\sqrt{2}$ |
| −17 | $(-1+j)/\sqrt{2}$ |
| −16 | $(-1+j)/\sqrt{2}$ |
| −15 | $(1-j)/\sqrt{2}$ |
| −14 | $(-1+j)/\sqrt{2}$ |
| −13 | $(1-j)/\sqrt{2}$ |
| −12 | $(-1+j)/\sqrt{2}$ |
| −11 | $(1-j)/\sqrt{2}$ |
| −10 | $(1-j)/\sqrt{2}$ |
| −9 | $(1-j)/\sqrt{2}$ |
| −8 | $(-1+j)/\sqrt{2}$ |
| −7 | $(-1+j)/\sqrt{2}$ |
| −6 | $(-1+j)/\sqrt{2}$ |
| −5 | $(-1+j)/\sqrt{2}$ |
| −4 | $(-1+j)/\sqrt{2}$ |
| −3 | $(1-j)/\sqrt{2}$ |
| −2 | $(-1+j)/\sqrt{2}$ |
| −1 | $(1-j)/\sqrt{2}$ |
| 1 | $(1+j)/\sqrt{2}$ |
| 2 | $-(1+j)/\sqrt{2}$ |
| 3 | $(1+j)/\sqrt{2}$ |
| 4 | $-(1+j)/\sqrt{2}$ |
| 5 | $-(1+j)/\sqrt{2}$ |
| 6 | $-(1+j)/\sqrt{2}$ |
| 7 | $-(1+j)/\sqrt{2}$ |
| 8 | $-(1+j)/\sqrt{2}$ |
| 9 | $(1+j)/\sqrt{2}$ |
| 10 | $(1+j)/\sqrt{2}$ |
| 11 | $(1+j)/\sqrt{2}$ |
| 12 | $-(1+j)/\sqrt{2}$ |
| 13 | $(1+j)/\sqrt{2}$ |
| 14 | $-(1+j)/\sqrt{2}$ |
| 15 | $(1+j)/\sqrt{2}$ |
| 16 | $-(1+j)/\sqrt{2}$ |
| 17 | $-(1+j)/\sqrt{2}$ |
| 18 | $-(1+j)/\sqrt{2}$ |
| 19 | $-(1+j)/\sqrt{2}$ |
| 20 | $(1+j)/\sqrt{2}$ |
| 21 | $-(1+j)/\sqrt{2}$ |
| 22 | $-(1+j)/\sqrt{2}$ |
| 23 | $(1+j)/\sqrt{2}$ |
| 24 | $-(1+j)/\sqrt{2}$ |
| 25 | $-(1+j)/\sqrt{2}$ |
| 26 | $-(1+j)/\sqrt{2}$ |
| 27 | $(1+j)/\sqrt{2}$ |
| 28 | $(1+j)/\sqrt{2}$ |
| 29 | $(1+j)/\sqrt{2}$ |
| 30 | $-(1+j)/\sqrt{2}$ |
| 31 | $-(1+j)/\sqrt{2}$ |
| 32 | $(1+j)/\sqrt{2}$ |
| 33 | $-(1+j)/\sqrt{2}$ |
| 34 | $-(1+j)/\sqrt{2}$ |
| 35 | $-(1+j)/\sqrt{2}$ |
| 36 | $(1+j)/\sqrt{2}$ |
| 37 | $-(1+j)/\sqrt{2}$ |
| 38 | $(1+j)/\sqrt{2}$ |
| 39 | $-(1+j)/\sqrt{2}$ |
| 40 | $-(1+j)/\sqrt{2}$ |
| 41 | $-(1+j)/\sqrt{2}$ |
| 42 | $-(1+j)/\sqrt{2}$ |
| 43 | $-(1+j)/\sqrt{2}$ |
| 44 | $-(1+j)/\sqrt{2}$ |
| 45 | $(1+j)/\sqrt{2}$ |
| 46 | $-(1+j)/\sqrt{2}$ |
| 47 | $-(1+j)/\sqrt{2}$ |
| 48 | $-(1+j)/\sqrt{2}$ |
| 49 | $(1+j)/\sqrt{2}$ |
| 50 | $-(1+j)/\sqrt{2}$ |
| 51 | $(1+j)/\sqrt{2}$ |
| 52 | $(1+j)/\sqrt{2}$ |
| 53 | $(1+j)/\sqrt{2}$ |
| 54 | $-(1+j)/\sqrt{2}$ |
| 55 | $-(1+j)/\sqrt{2}$ |
| 56 | $(1+j)/\sqrt{2}$ . |

6. The transceiver of claim 1, wherein the frequency domain sequence specifies Tone Number and Value as follows:

| Tone Number | Value |
|---|---|
| −56 | 1 |
| −55 | −1 |
| −54 | −1 |
| −53 | 1 |
| −52 | −1 |
| −51 | −1 |
| −50 | 1 |
| −49 | 1 |
| −48 | −1 |
| −47 | 1 |
| −46 | −1 |

-continued

| Tone Number | Value |
| --- | --- |
| −45 | −1 |
| −44 | −1 |
| −43 | 1 |
| −42 | −1 |
| −41 | 1 |
| −40 | 1 |
| −39 | −1 |
| −38 | −1 |
| −37 | −1 |
| −36 | 1 |
| −35 | −1 |
| −34 | −1 |
| −33 | −1 |
| −32 | 1 |
| −31 | 1 |
| −30 | 1 |
| −29 | 1 |
| −28 | 1 |
| −27 | −1 |
| −26 | 1 |
| −25 | 1 |
| −24 | 1 |
| −23 | −1 |
| −22 | 1 |
| −21 | −1 |
| −20 | 1 |
| −19 | −1 |
| −18 | −1 |
| −17 | 1 |
| −16 | −1 |
| −15 | −1 |
| −14 | −1 |
| −13 | 1 |
| −12 | 1 |
| −11 | −1 |
| −10 | 1 |
| −9 | 1 |
| −8 | 1 |
| −7 | −1 |
| −6 | −1 |
| −5 | 1 |
| −4 | 1 |
| −3 | 1 |
| −2 | 1 |
| −1 | 1 |
| 1 | 1 |
| 2 | 1 |
| 3 | 1 |
| 4 | 1 |
| 5 | 1 |
| 6 | −1 |
| 7 | −1 |
| 8 | 1 |
| 9 | 1 |
| 10 | 1 |
| 11 | −1 |
| 12 | 1 |
| 13 | 1 |
| 14 | −1 |
| 15 | −1 |
| 16 | −1 |
| 17 | 1 |
| 18 | −1 |
| 19 | −1 |
| 20 | 1 |
| 21 | −1 |
| 22 | 1 |
| 23 | −1 |
| 24 | 1 |
| 25 | 1 |
| 26 | 1 |
| 27 | −1 |
| 28 | 1 |
| 29 | 1 |
| 30 | 1 |
| 31 | 1 |
| 32 | 1 |
| 33 | −1 |
| 34 | −1 |
| 35 | −1 |
| 36 | 1 |
| 37 | −1 |
| 38 | −1 |
| 39 | −1 |
| 40 | 1 |
| 41 | 1 |
| 42 | −1 |
| 43 | 1 |
| 44 | −1 |
| 45 | −1 |
| 46 | −1 |
| 47 | 1 |
| 48 | −1 |
| 49 | 1 |
| 50 | 1 |
| 51 | −1 |
| 52 | −1 |
| 53 | 1 |
| 54 | −1 |
| 55 | −1 |
| 56 | 1. |

7. A transceiver for a wireless communications system comprising;

a transmitter comprising preamble transmission circuitry;

a memory storing a preamble, the preamble comprising a first sequence wherein the first sequence comprises a concatenation of a first set of sub-sequences, with each sub-sequence containing more than one zero, and wherein each sub-sequence differs depending upon its position in the preamble and wherein the first sequence comprises a third sequence wherein the third sequence comprises a concatenation of multiple copies of a first sub-sequence; and a fourth sequence wherein the fourth sequence comprises a concatenation of multiple copies of a fifth sequence comprising 180-degree rotations of each member of the first sub-sequence.

8. The transceiver of claim 7, wherein the first sub-sequence is a hierarchical sequence.

9. The transceiver of claim 8, wherein the first sub-sequence is created by spreading a first hierarchical sequence with a second hierarchical sequence, wherein the two hierarchical sequences are shorter than the first sub-sequence.

10. The transceiver of claim 9, wherein the first hierarchical sequence is a sequence selected from:

| Sequence | | | | | | | | | | | | | | | |
|---|---|---|---|---|---|---|---|---|---|---|---|---|---|---|---|
| #1 | 1 | 1 | 1 | 1 | -1 | -1 | 1 | 1 | -1 | -1 | 1 | -1 | 1 | -1 | 1 | 1 |
| #2 | 1 | -1 | -1 | -1 | -1 | -1 | 1 | -1 | 1 | -1 | 1 | 1 | -1 | -1 | -1 | 1 |
| #3 | 1 | 1 | -1 | -1 | -1 | 1 | -1 | -1 | -1 | 1 | -1 | -1 | 1 | -1 | 1 | 1 |
| #4 | 1 | -1 | -1 | 1 | -1 | 1 | -1 | -1 | 1 | 1 | -1 | -1 | -1 | -1 | -1 | 1. |

11. The transceiver of claim 9, wherein the second hierarchical sequence is a sequence selected from:

| Sequence | | | | | | | | |
|---|---|---|---|---|---|---|---|---|
| #1 | 1 | -1 | -1 | -1 | 1 | 1 | -1 | 1 |
| #2 | 1 | -1 | 1 | 1 | -1 | -1 | -1 | 1 |
| #3 | 1 | 1 | -1 | 1 | 1 | -1 | -1 | -1 |
| #4 | 1 | 1 | 1 | -1 | -1 | 1 | -1 | -1. |

12. The transceiver of claim 9, wherein a time domain sequence specifies Sequence Element and Value as follows:

| Sequence Element | Value |
|---|---|
| $C_0$ | 1 |
| $C_1$ | -1 |
| $C_2$ | -1 |
| $C_3$ | -1 |
| $C_4$ | 1 |
| $C_5$ | 1 |
| $C_6$ | -1 |
| $C_7$ | 1 |
| $C_8$ | 1 |
| $C_9$ | -1 |
| $C_{10}$ | -1 |
| $C_{11}$ | -1 |
| $C_{12}$ | 1 |
| $C_{13}$ | 1 |
| $C_{14}$ | -1 |
| $C_{15}$ | 1 |
| $C_{16}$ | 1 |
| $C_{17}$ | -1 |
| $C_{18}$ | -1 |
| $C_{19}$ | -1 |
| $C_{20}$ | 1 |
| $C_{21}$ | 1 |
| $C_{22}$ | -1 |
| $C_{23}$ | 1 |
| $C_{24}$ | 1 |
| $C_{25}$ | -1 |
| $C_{26}$ | -1 |
| $C_{27}$ | -1 |
| $C_{28}$ | 1 |
| $C_{29}$ | 1 |
| $C_{30}$ | -1 |
| $C_{31}$ | 1 |
| $C_{32}$ | -1 |
| $C_{33}$ | 1 |
| $C_{34}$ | 1 |
| $C_{35}$ | 1 |
| $C_{36}$ | -1 |
| $C_{37}$ | -1 |
| $C_{38}$ | 1 |
| $C_{39}$ | -1 |
| $C_{40}$ | -1 |
| $C_{41}$ | 1 |
| $C_{42}$ | 1 |
| $C_{43}$ | 1 |
| $C_{44}$ | -1 |
| $C_{45}$ | -1 |
| $C_{46}$ | 1 |

-continued

| Sequence Element | Value |
|---|---|
| $C_{47}$ | -1 |
| $C_{48}$ | 1 |
| $C_{49}$ | -1 |
| $C_{50}$ | -1 |
| $C_{51}$ | -1 |
| $C_{52}$ | 1 |
| $C_{53}$ | 1 |
| $C_{54}$ | -1 |
| $C_{55}$ | 1 |
| $C_{56}$ | 1 |
| $C_{57}$ | -1 |
| $C_{58}$ | -1 |
| $C_{59}$ | -1 |
| $C_{60}$ | 1 |
| $C_{61}$ | 1 |
| $C_{62}$ | -1 |
| $C_{63}$ | 1 |
| $C_{64}$ | -1 |
| $C_{65}$ | 1 |
| $C_{66}$ | 1 |
| $C_{67}$ | 1 |
| $C_{68}$ | -1 |
| $C_{69}$ | -1 |
| $C_{70}$ | 1 |
| $C_{71}$ | -1 |
| $C_{72}$ | -1 |
| $C_{73}$ | 1 |
| $C_{74}$ | 1 |
| $C_{75}$ | 1 |
| $C_{76}$ | -1 |
| $C_{77}$ | -1 |
| $C_{78}$ | 1 |
| $C_{79}$ | -1 |
| $C_{80}$ | 1 |
| $C_{81}$ | -1 |
| $C_{82}$ | -1 |
| $C_{83}$ | -1 |
| $C_{84}$ | 1 |
| $C_{85}$ | 1 |
| $C_{86}$ | -1 |
| $C_{87}$ | 1 |
| $C_{88}$ | -1 |
| $C_{89}$ | 1 |
| $C_{90}$ | 1 |
| $C_{91}$ | 1 |
| $C_{92}$ | -1 |
| $C_{93}$ | -1 |
| $C_{94}$ | 1 |
| $C_{95}$ | -1 |
| $C_{96}$ | 1 |
| $C_{97}$ | -1 |
| $C_{98}$ | -1 |
| $C_{99}$ | -1 |
| $C_{100}$ | 1 |
| $C_{101}$ | 1 |
| $C_{102}$ | -1 |
| $C_{103}$ | 1 |
| $C_{104}$ | -1 |
| $C_{105}$ | 1 |
| $C_{106}$ | 1 |
| $C_{107}$ | 1 |
| $C_{108}$ | -1 |
| $C_{109}$ | -1 |

| Sequence Element | Value |
| --- | --- |
| $C_{110}$ | 1 |
| $C_{111}$ | −1 |
| $C_{112}$ | 1 |
| $C_{113}$ | −1 |
| $C_{114}$ | −1 |
| $C_{115}$ | −1 |
| $C_{116}$ | 1 |
| $C_{117}$ | 1 |
| $C_{118}$ | −1 |
| $C_{119}$ | 1 |
| $C_{120}$ | 1 |
| $C_{121}$ | −1 |
| $C_{122}$ | −1 |
| $C_{123}$ | −1 |
| $C_{124}$ | 1 |
| $C_{125}$ | 1 |
| $C_{126}$ | −1 |
| $C_{127}$ | 1. |

13. The transceiver of claim 9, wherein a time domain sequence specifies Sequence Element and Value as follows:

| Sequence Element | Value |
| --- | --- |
| $C_0$ | 1 |
| $C_1$ | −1 |
| $C_2$ | 1 |
| $C_3$ | 1 |
| $C_4$ | −1 |
| $C_5$ | −1 |
| $C_6$ | −1 |
| $C_7$ | 1 |
| $C_8$ | −1 |
| $C_9$ | 1 |
| $C_{10}$ | −1 |
| $C_{11}$ | −1 |
| $C_{12}$ | 1 |
| $C_{13}$ | 1 |
| $C_{14}$ | 1 |
| $C_{15}$ | −1 |
| $C_{16}$ | −1 |
| $C_{17}$ | 1 |
| $C_{18}$ | −1 |
| $C_{19}$ | −1 |
| $C_{20}$ | 1 |
| $C_{21}$ | 1 |
| $C_{22}$ | 1 |
| $C_{23}$ | −1 |
| $C_{24}$ | −1 |
| $C_{25}$ | 1 |
| $C_{26}$ | −1 |
| $C_{27}$ | −1 |
| $C_{28}$ | 1 |
| $C_{29}$ | 1 |
| $C_{30}$ | 1 |
| $C_{31}$ | −1 |
| $C_{32}$ | −1 |
| $C_{33}$ | 1 |
| $C_{34}$ | −1 |
| $C_{35}$ | −1 |
| $C_{36}$ | 1 |
| $C_{37}$ | 1 |
| $C_{38}$ | 1 |
| $C_{39}$ | −1 |
| $C_{40}$ | −1 |
| $C_{41}$ | 1 |
| $C_{42}$ | −1 |
| $C_{43}$ | −1 |
| $C_{44}$ | 1 |
| $C_{45}$ | 1 |
| $C_{46}$ | 1 |
| $C_{47}$ | −1 |
| $C_{48}$ | 1 |
| $C_{49}$ | −1 |
| $C_{50}$ | 1 |
| $C_{51}$ | 1 |
| $C_{52}$ | −1 |
| $C_{53}$ | −1 |
| $C_{54}$ | −1 |
| $C_{55}$ | 1 |
| $C_{56}$ | −1 |
| $C_{57}$ | 1 |
| $C_{58}$ | −1 |
| $C_{59}$ | −1 |
| $C_{60}$ | 1 |
| $C_{61}$ | 1 |
| $C_{62}$ | 1 |
| $C_{63}$ | −1 |
| $C_{64}$ | 1 |
| $C_{65}$ | −1 |
| $C_{66}$ | 1 |
| $C_{67}$ | 1 |
| $C_{68}$ | −1 |
| $C_{69}$ | −1 |
| $C_{70}$ | −1 |
| $C_{71}$ | 1 |
| $C_{72}$ | −1 |
| $C_{73}$ | 1 |
| $C_{74}$ | −1 |
| $C_{75}$ | −1 |
| $C_{76}$ | 1 |
| $C_{77}$ | 1 |
| $C_{78}$ | 1 |
| $C_{79}$ | −1 |
| $C_{80}$ | −1 |
| $C_{81}$ | 1 |
| $C_{82}$ | −1 |
| $C_{83}$ | −1 |
| $C_{84}$ | 1 |
| $C_{85}$ | 1 |
| $C_{86}$ | 1 |
| $C_{87}$ | −1 |
| $C_{88}$ | 1 |
| $C_{89}$ | −1 |
| $C_{90}$ | 1 |
| $C_{91}$ | 1 |
| $C_{92}$ | −1 |
| $C_{93}$ | −1 |
| $C_{94}$ | −1 |
| $C_{95}$ | 1 |
| $C_{96}$ | 1 |
| $C_{97}$ | −1 |
| $C_{98}$ | 1 |
| $C_{99}$ | 1 |
| $C_{100}$ | −1 |
| $C_{101}$ | −1 |
| $C_{102}$ | −1 |
| $C_{103}$ | 1 |
| $C_{104}$ | −1 |
| $C_{105}$ | 1 |
| $C_{106}$ | −1 |
| $C_{107}$ | −1 |
| $C_{108}$ | 1 |
| $C_{109}$ | 1 |
| $C_{110}$ | 1 |
| $C_{111}$ | −1 |
| $C_{112}$ | −1 |
| $C_{113}$ | 1 |
| $C_{114}$ | −1 |
| $C_{115}$ | −1 |
| $C_{116}$ | 1 |
| $C_{117}$ | 1 |
| $C_{118}$ | 1 |
| $C_{119}$ | −1 |
| $C_{120}$ | 1 |
| $C_{121}$ | −1 |
| $C_{122}$ | 1 |

| Sequence Element | Value |
| --- | --- |
| $C_{123}$ | 1 |
| $C_{124}$ | -1 |
| $C_{125}$ | -1 |
| $C_{126}$ | -1 |
| $C_{127}$ | 1. |

14. The transceiver of claim 9, wherein a time domain sequence specifies Sequence Element and Value as follows:

| Sequence Element | Value |
| --- | --- |
| $C_0$ | 1 |
| $C_1$ | 1 |
| $C_2$ | -1 |
| $C_3$ | 1 |
| $C_4$ | 1 |
| $C_5$ | -1 |
| $C_6$ | -1 |
| $C_7$ | -1 |
| $C_8$ | 1 |
| $C_9$ | 1 |
| $C_{10}$ | -1 |
| $C_{11}$ | 1 |
| $C_{12}$ | 1 |
| $C_{13}$ | -1 |
| $C_{14}$ | -1 |
| $C_{15}$ | -1 |
| $C_{16}$ | -1 |
| $C_{17}$ | -1 |
| $C_{18}$ | 1 |
| $C_{19}$ | -1 |
| $C_{20}$ | -1 |
| $C_{21}$ | 1 |
| $C_{22}$ | 1 |
| $C_{23}$ | 1 |
| $C_{24}$ | -1 |
| $C_{25}$ | -1 |
| $C_{26}$ | 1 |
| $C_{27}$ | -1 |
| $C_{28}$ | -1 |
| $C_{29}$ | 1 |
| $C_{30}$ | 1 |
| $C_{31}$ | 1 |
| $C_{32}$ | -1 |
| $C_{33}$ | -1 |
| $C_{34}$ | 1 |
| $C_{35}$ | -1 |
| $C_{36}$ | -1 |
| $C_{37}$ | 1 |
| $C_{38}$ | 1 |
| $C_{39}$ | 1 |
| $C_{40}$ | 1 |
| $C_{41}$ | 1 |
| $C_{42}$ | -1 |
| $C_{43}$ | 1 |
| $C_{44}$ | 1 |
| $C_{45}$ | -1 |
| $C_{46}$ | -1 |
| $C_{47}$ | -1 |
| $C_{48}$ | -1 |
| $C_{49}$ | -1 |
| $C_{50}$ | 1 |
| $C_{51}$ | -1 |
| $C_{52}$ | -1 |
| $C_{53}$ | 1 |
| $C_{54}$ | 1 |
| $C_{55}$ | 1 |
| $C_{56}$ | -1 |
| $C_{57}$ | -1 |
| $C_{58}$ | 1 |
| $C_{59}$ | -1 |
| $C_{60}$ | -1 |
| $C_{61}$ | 1 |
| $C_{62}$ | 1 |
| $C_{63}$ | 1 |
| $C_{64}$ | -1 |
| $C_{65}$ | -1 |
| $C_{66}$ | 1 |
| $C_{67}$ | -1 |
| $C_{68}$ | -1 |
| $C_{69}$ | 1 |
| $C_{70}$ | 1 |
| $C_{71}$ | 1 |
| $C_{72}$ | 1 |
| $C_{73}$ | 1 |
| $C_{74}$ | -1 |
| $C_{75}$ | 1 |
| $C_{76}$ | 1 |
| $C_{77}$ | -1 |
| $C_{78}$ | -1 |
| $C_{79}$ | -1 |
| $C_{80}$ | -1 |
| $C_{81}$ | -1 |
| $C_{82}$ | 1 |
| $C_{83}$ | -1 |
| $C_{84}$ | -1 |
| $C_{85}$ | 1 |
| $C_{86}$ | 1 |
| $C_{87}$ | 1 |
| $C_{88}$ | -1 |
| $C_{89}$ | -1 |
| $C_{90}$ | 1 |
| $C_{91}$ | -1 |
| $C_{92}$ | -1 |
| $C_{93}$ | 1 |
| $C_{94}$ | 1 |
| $C_{95}$ | 1 |
| $C_{96}$ | 1 |
| $C_{97}$ | 1 |
| $C_{98}$ | -1 |
| $C_{99}$ | 1 |
| $C_{100}$ | 1 |
| $C_{101}$ | -1 |
| $C_{102}$ | -1 |
| $C_{103}$ | -1 |
| $C_{104}$ | -1 |
| $C_{105}$ | -1 |
| $C_{106}$ | 1 |
| $C_{107}$ | -1 |
| $C_{108}$ | -1 |
| $C_{109}$ | 1 |
| $C_{110}$ | 1 |
| $C_{111}$ | 1 |
| $C_{112}$ | 1 |
| $C_{113}$ | 1 |
| $C_{114}$ | -1 |
| $C_{115}$ | 1 |
| $C_{116}$ | 1 |
| $C_{117}$ | -1 |
| $C_{118}$ | -1 |
| $C_{119}$ | -1 |
| $C_{120}$ | 1 |
| $C_{121}$ | 1 |
| $C_{122}$ | -1 |
| $C_{123}$ | 1 |
| $C_{124}$ | 1 |
| $C_{125}$ | -1 |
| $C_{126}$ | -1 |
| $C_{127}$ | -1. |

15. The transceiver of claim 9, wherein a time domain sequence specifies Sequence Element and Value follows:

| Sequence Element | Value |
|---|---|
| $C_0$ | 1 |
| $C_1$ | 1 |
| $C_2$ | 1 |
| $C_3$ | −1 |
| $C_4$ | −1 |
| $C_5$ | 1 |
| $C_6$ | −1 |
| $C_7$ | −1 |
| $C_8$ | −1 |
| $C_9$ | −1 |
| $C_{10}$ | −1 |
| $C_{11}$ | 1 |
| $C_{12}$ | 1 |
| $C_{13}$ | −1 |
| $C_{14}$ | 1 |
| $C_{15}$ | 1 |
| $C_{16}$ | −1 |
| $C_{17}$ | −1 |
| $C_{18}$ | −1 |
| $C_{19}$ | 1 |
| $C_{20}$ | 1 |
| $C_{21}$ | −1 |
| $C_{22}$ | 1 |
| $C_{23}$ | 1 |
| $C_{24}$ | 1 |
| $C_{25}$ | 1 |
| $C_{26}$ | 1 |
| $C_{27}$ | −1 |
| $C_{28}$ | −1 |
| $C_{29}$ | 1 |
| $C_{30}$ | −1 |
| $C_{31}$ | −1 |
| $C_{32}$ | −1 |
| $C_{33}$ | −1 |
| $C_{34}$ | −1 |
| $C_{35}$ | 1 |
| $C_{36}$ | 1 |
| $C_{37}$ | −1 |
| $C_{38}$ | 1 |
| $C_{39}$ | 1 |
| $C_{40}$ | 1 |
| $C_{41}$ | 1 |
| $C_{42}$ | 1 |
| $C_{43}$ | −1 |
| $C_{44}$ | −1 |
| $C_{45}$ | 1 |
| $C_{46}$ | −1 |
| $C_{47}$ | −1 |
| $C_{48}$ | −1 |
| $C_{49}$ | −1 |
| $C_{50}$ | −1 |
| $C_{51}$ | 1 |
| $C_{52}$ | 1 |
| $C_{53}$ | −1 |
| $C_{54}$ | 1 |
| $C_{55}$ | 1 |
| $C_{56}$ | −1 |
| $C_{57}$ | −1 |
| $C_{58}$ | −1 |
| $C_{59}$ | 1 |
| $C_{60}$ | 1 |
| $C_{61}$ | −1 |
| $C_{62}$ | 1 |
| $C_{63}$ | 1 |
| $C_{64}$ | 1 |
| $C_{65}$ | 1 |
| $C_{66}$ | 1 |
| $C_{67}$ | −1 |
| $C_{68}$ | −1 |
| $C_{69}$ | 1 |
| $C_{70}$ | −1 |
| $C_{71}$ | −1 |
| $C_{72}$ | 1 |
| $C_{73}$ | 1 |
| $C_{74}$ | 1 |
| $C_{75}$ | −1 |
| $C_{76}$ | −1 |
| $C_{77}$ | 1 |
| $C_{78}$ | −1 |
| $C_{79}$ | −1 |
| $C_{80}$ | −1 |
| $C_{81}$ | −1 |
| $C_{82}$ | −1 |
| $C_{83}$ | 1 |
| $C_{84}$ | 1 |
| $C_{85}$ | −1 |
| $C_{86}$ | 1 |
| $C_{87}$ | 1 |
| $C_{88}$ | −1 |
| $C_{89}$ | −1 |
| $C_{90}$ | −1 |
| $C_{91}$ | 1 |
| $C_{92}$ | 1 |
| $C_{93}$ | −1 |
| $C_{94}$ | 1 |
| $C_{95}$ | 1 |
| $C_{96}$ | −1 |
| $C_{97}$ | −1 |
| $C_{98}$ | −1 |
| $C_{99}$ | 1 |
| $C_{100}$ | 1 |
| $C_{101}$ | −1 |
| $C_{102}$ | 1 |
| $C_{103}$ | 1 |
| $C_{104}$ | −1 |
| $C_{105}$ | −1 |
| $C_{106}$ | −1 |
| $C_{107}$ | 1 |
| $C_{108}$ | 1 |
| $C_{109}$ | −1 |
| $C_{110}$ | 1 |
| $C_{111}$ | 1 |
| $C_{112}$ | −1 |
| $C_{113}$ | −1 |
| $C_{114}$ | −1 |
| $C_{115}$ | 1 |
| $C_{116}$ | 1 |
| $C_{117}$ | −1 |
| $C_{118}$ | 1 |
| $C_{119}$ | 1 |
| $C_{120}$ | 1 |
| $C_{121}$ | 1 |
| $C_{122}$ | 1 |
| $C_{123}$ | −1 |
| $C_{124}$ | −1 |
| $C_{125}$ | 1 |
| $C_{126}$ | −1 |
| $C_{127}$ | −1. |

16. The transceiver of claim 7, wherein the third sequence comprises multiple copies of the first sub-sequence combined with a guard band.

17. The transceiver of claim 16, wherein the third sequence comprises multiple copies of the first sub-sequence with a postpended guard band and a prepended sequence.

18. The transceiver of claim 17, wherein the third sequence comprises twenty one (21) copies of the first sub-sequence with a postpended guard band and a prepended sequence.

19. The transceiver of claim 17, wherein the third sequence comprises nine (9) copies of the first sub-sequence with a postpended guard band and a prepended sequence.

20. The transceiver of claim 17, wherein the guard band comprises a sequence of five (5) zero samples.

21. The transceiver of claim 17, wherein the prepended sequence is a zero-padded sequence.

22. The transceiver of claim 17, wherein the prepended sequence is a cyclic prefix.

23. The transceiver of claim 7, wherein the fourth sequence comprises multiple copies of the fifth sequence combined with a guard band.

24. The transceiver of claim 23, wherein the fourth sequence comprises three (3) copies of the fifth sequence with a postpended guard band and a prepended sequence.

25. The transceiver of claim 7, wherein the third sequence comprises multiple concatenated copies of the first sub-sequence, wherein the fourth sequence comprises multiple concatenated copies of the fifth sequence, and wherein the third and fourth sequences are interleaved.

26. The transceiver of claim 25, wherein the preamble is used in a communications system that changes transmit frequency based on a transmit code, and wherein the length of the interleaved third and fourth sequence is an integer multiple of a period of the transmit code.

27. The transceiver of claim 7, wherein the wireless communications system uses orthogonal frequency division multiple access.

28. The transceiver of claim 27, wherein the wireless communications system is a time-frequency interleaved, orthogonal frequency division multiple access communications system.

29. The transceiver of claim 7, wherein the preamble can be transformed prior to transmission.

30. The transceiver of claim 29, wherein the transformation comprises a time-domain filtering.

31. The transceiver of claim 29, wherein the transformation comprises:
a first domain conversion;
processing the domain converted preamble; and
a second domain conversion.

32. The transceiver of claim 31, wherein the processing comprises magnitude clipping, and wherein a time domain sequence after the second domain conversion is specified as follows:

| Sequence Element | Value |
| --- | --- |
| $C_0$ | 0.9679 |
| $C_1$ | -1.0186 |
| $C_2$ | 0.4883 |
| $C_3$ | 0.5432 |
| $C_4$ | -1.4702 |
| $C_5$ | -1.4507 |
| $C_6$ | -1.1752 |
| $C_7$ | -0.0730 |
| $C_8$ | -1.2445 |
| $C_9$ | 0.3143 |
| $C_{10}$ | -1.3951 |
| $C_{11}$ | -0.9694 |
| $C_{12}$ | 0.4563 |
| $C_{13}$ | 0.3073 |
| $C_{14}$ | 0.6408 |
| $C_{15}$ | -0.9798 |
| $C_{16}$ | -1.4116 |
| $C_{17}$ | 0.6038 |
| $C_{18}$ | -1.3860 |
| $C_{19}$ | -1.0888 |
| $C_{20}$ | 1.1036 |
| $C_{21}$ | 0.7067 |
| $C_{22}$ | 1.1667 |
| $C_{23}$ | -1.0225 |
| $C_{24}$ | -1.2471 |
| $C_{25}$ | 0.7788 |
| $C_{26}$ | -1.2716 |
| $C_{27}$ | -0.8745 |
| $C_{28}$ | 1.2175 |
| $C_{29}$ | 0.8419 |
| $C_{30}$ | 1.2881 |

-continued

| Sequence Element | Value |
| --- | --- |
| $C_{31}$ | -0.8210 |
| $C_{32}$ | -1.2905 |
| $C_{33}$ | 1.1040 |
| $C_{34}$ | -1.2408 |
| $C_{35}$ | -0.8062 |
| $C_{36}$ | 1.5425 |
| $C_{37}$ | 1.0955 |
| $C_{38}$ | 1.4284 |
| $C_{39}$ | -0.4593 |
| $C_{40}$ | -1.0408 |
| $C_{41}$ | 1.0542 |
| $C_{42}$ | -0.4446 |
| $C_{43}$ | -0.7929 |
| $C_{44}$ | 1.6733 |
| $C_{45}$ | 1.7568 |
| $C_{46}$ | 1.3273 |
| $C_{47}$ | -0.2465 |
| $C_{48}$ | 1.6850 |
| $C_{49}$ | -0.7091 |
| $C_{50}$ | 1.1396 |
| $C_{51}$ | 1.5114 |
| $C_{52}$ | -1.4343 |
| $C_{53}$ | -1.5005 |
| $C_{54}$ | -1.2572 |
| $C_{55}$ | 0.8274 |
| $C_{56}$ | -1.5140 |
| $C_{57}$ | 1.1421 |
| $C_{58}$ | -1.0135 |
| $C_{59}$ | -1.0657 |
| $C_{60}$ | 1.4073 |
| $C_{61}$ | 1.8196 |
| $C_{62}$ | 1.1679 |
| $C_{63}$ | -0.4131 |
| $C_{64}$ | 1.5280 |
| $C_{65}$ | -0.9193 |
| $C_{66}$ | 1.1246 |
| $C_{67}$ | 1.2622 |
| $C_{68}$ | -1.4406 |
| $C_{69}$ | -1.4929 |
| $C_{70}$ | -1.1508 |
| $C_{71}$ | 0.4126 |
| $C_{72}$ | -1.0462 |
| $C_{73}$ | 0.7232 |
| $C_{74}$ | -1.1574 |
| $C_{75}$ | -0.7102 |
| $C_{76}$ | 0.8502 |
| $C_{77}$ | 0.6260 |
| $C_{78}$ | 0.9530 |
| $C_{79}$ | -0.4971 |
| $C_{80}$ | -0.8633 |
| $C_{81}$ | 0.6910 |
| $C_{82}$ | -0.3639 |
| $C_{83}$ | -0.8874 |
| $C_{84}$ | 1.5311 |
| $C_{85}$ | 1.1546 |
| $C_{86}$ | 1.1935 |
| $C_{87}$ | -0.2930 |
| $C_{88}$ | 1.3285 |
| $C_{89}$ | -0.7231 |
| $C_{90}$ | 1.2832 |
| $C_{91}$ | 0.7878 |
| $C_{92}$ | -0.8095 |
| $C_{93}$ | -0.7463 |
| $C_{94}$ | -0.8973 |
| $C_{95}$ | 0.5560 |
| $C_{96}$ | 0.5193 |
| $C_{97}$ | -0.3439 |
| $C_{98}$ | 0.1428 |
| $C_{99}$ | 0.6251 |
| $C_{100}$ | -1.0468 |
| $C_{101}$ | -0.5798 |
| $C_{102}$ | -0.8237 |
| $C_{103}$ | 0.2667 |
| $C_{104}$ | -0.9563 |
| $C_{105}$ | 0.6016 |
| $C_{106}$ | -0.9964 |

| Sequence Element | Value |
| --- | --- |
| $C_{107}$ | −0.3541 |
| $C_{108}$ | 0.3965 |
| $C_{109}$ | 0.5201 |
| $C_{110}$ | 0.4733 |
| $C_{111}$ | −0.2362 |
| $C_{112}$ | −0.6892 |
| $C_{113}$ | 0.4787 |
| $C_{114}$ | −0.2605 |
| $C_{115}$ | −0.5887 |
| $C_{116}$ | 0.9411 |
| $C_{117}$ | 0.7364 |
| $C_{118}$ | 0.6714 |
| $C_{119}$ | −0.1746 |
| $C_{120}$ | 1.1776 |
| $C_{121}$ | −0.8803 |
| $C_{122}$ | 1.2542 |
| $C_{123}$ | 0.5111 |
| $C_{124}$ | −0.8209 |
| $C_{125}$ | −0.8975 |
| $C_{126}$ | −0.9091 |
| $C_{127}$ | 0.2562. |

33. The transceiver of claim 31, wherein the processing comprises magnitude clipping, and wherein a time domain sequence after the second domain conversion is specified as follows:

| Sequence Element | Value |
| --- | --- |
| $C_0$ | 0.4047 |
| $C_1$ | 0.5799 |
| $C_2$ | −0.3407 |
| $C_3$ | 0.4343 |
| $C_4$ | 0.0973 |
| $C_5$ | −0.7637 |
| $C_6$ | −0.6181 |
| $C_7$ | −0.6539 |
| $C_8$ | 0.3768 |
| $C_9$ | 0.7241 |
| $C_{10}$ | −1.2095 |
| $C_{11}$ | 0.6027 |
| $C_{12}$ | 0.4587 |
| $C_{13}$ | −1.3879 |
| $C_{14}$ | −1.0592 |
| $C_{15}$ | −1.4052 |
| $C_{16}$ | −0.8439 |
| $C_{17}$ | −1.5992 |
| $C_{18}$ | 1.1975 |
| $C_{19}$ | −1.9525 |
| $C_{20}$ | −1.5141 |
| $C_{21}$ | 0.7219 |
| $C_{22}$ | 0.6982 |
| $C_{23}$ | 1.2924 |
| $C_{24}$ | −0.9460 |
| $C_{25}$ | −1.2407 |
| $C_{26}$ | 0.4572 |
| $C_{27}$ | −1.2151 |
| $C_{28}$ | −0.9869 |
| $C_{29}$ | 1.2792 |
| $C_{30}$ | 0.6882 |
| $C_{31}$ | 1.2586 |
| $C_{32}$ | −0.9671 |
| $C_{33}$ | −0.9819 |
| $C_{34}$ | 0.7980 |
| $C_{35}$ | −0.8158 |
| $C_{36}$ | −0.9188 |
| $C_{37}$ | 1.5146 |
| $C_{38}$ | 0.8138 |
| $C_{39}$ | 1.3773 |
| $C_{40}$ | 0.2108 |
| $C_{41}$ | 0.9245 |
| $C_{42}$ | −1.2138 |
| $C_{43}$ | 1.1252 |
| $C_{44}$ | 0.9663 |
| $C_{45}$ | −0.8418 |
| $C_{46}$ | −0.6811 |
| $C_{47}$ | −1.3003 |
| $C_{48}$ | −0.3397 |
| $C_{49}$ | −1.1051 |
| $C_{50}$ | 1.2400 |
| $C_{51}$ | −1.3975 |
| $C_{52}$ | −0.7467 |
| $C_{53}$ | 0.2706 |
| $C_{54}$ | 0.7294 |
| $C_{55}$ | 0.7444 |
| $C_{56}$ | −0.3970 |
| $C_{57}$ | −1.0718 |
| $C_{58}$ | 0.6646 |
| $C_{59}$ | −1.1037 |
| $C_{60}$ | −0.5716 |
| $C_{61}$ | 0.9001 |
| $C_{62}$ | 0.7317 |
| $C_{63}$ | 0.9846 |
| $C_{64}$ | −0.7298 |
| $C_{65}$ | −0.9662 |
| $C_{66}$ | 0.9694 |
| $C_{67}$ | −0.8053 |
| $C_{68}$ | −0.9052 |
| $C_{69}$ | 1.5933 |
| $C_{70}$ | 0.8418 |
| $C_{71}$ | 1.5363 |
| $C_{72}$ | 0.3085 |
| $C_{73}$ | 1.3016 |
| $C_{74}$ | −1.5546 |
| $C_{75}$ | 1.5347 |
| $C_{76}$ | 1.0935 |
| $C_{77}$ | −0.8978 |
| $C_{78}$ | −0.9712 |
| $C_{79}$ | −1.3763 |
| $C_{80}$ | −0.6360 |
| $C_{81}$ | −1.2947 |
| $C_{82}$ | 1.6436 |
| $C_{83}$ | −1.6564 |
| $C_{84}$ | −1.1981 |
| $C_{85}$ | 0.8719 |
| $C_{86}$ | 0.9992 |
| $C_{87}$ | 1.4872 |
| $C_{88}$ | −0.4586 |
| $C_{89}$ | −0.8404 |
| $C_{90}$ | 0.6982 |
| $C_{91}$ | −0.7959 |
| $C_{92}$ | −0.5692 |
| $C_{93}$ | 1.3528 |
| $C_{94}$ | 0.9536 |
| $C_{95}$ | 1.1784 |
| $C_{96}$ | 0.2424 |
| $C_{97}$ | 0.5703 |
| $C_{98}$ | −0.6381 |
| $C_{99}$ | 0.7861 |
| $C_{100}$ | 0.9175 |
| $C_{101}$ | −0.4595 |
| $C_{102}$ | −0.2201 |
| $C_{103}$ | −0.7755 |
| $C_{104}$ | −0.2965 |
| $C_{105}$ | −1.1220 |
| $C_{106}$ | 1.7152 |
| $C_{107}$ | −1.2756 |
| $C_{108}$ | −0.7731 |
| $C_{109}$ | 1.0724 |
| $C_{110}$ | 1.1733 |
| $C_{111}$ | 1.4711 |
| $C_{112}$ | 0.4881 |
| $C_{113}$ | 0.7528 |
| $C_{114}$ | −0.6417 |
| $C_{115}$ | 1.0363 |
| $C_{116}$ | 0.8002 |

-continued

| Sequence Element | Value |
|---|---|
| $C_{117}$ | −0.0077 |
| $C_{118}$ | −0.2336 |
| $C_{119}$ | −0.4653 |
| $C_{120}$ | 0.6862 |
| $C_{121}$ | 1.2716 |
| $C_{122}$ | −0.8880 |
| $C_{123}$ | 1.4011 |
| $C_{124}$ | 0.9531 |
| $C_{125}$ | −1.1210 |
| $C_{126}$ | −0.9489 |
| $C_{127}$ | −1.2566. |

34. The transceiver of claim 31, wherein the processing comprises magnitude clipping, and wherein a time domain sequence after the second domain conversion is specified as follows:

| Sequence Element | Value |
|---|---|
| $C_0$ | 1.1549 |
| $C_1$ | 1.0079 |
| $C_2$ | 0.7356 |
| $C_3$ | −0.7434 |
| $C_4$ | −1.3930 |
| $C_5$ | 1.2818 |
| $C_6$ | −1.1033 |
| $C_7$ | −0.2523 |
| $C_8$ | −0.7905 |
| $C_9$ | −0.4261 |
| $C_{10}$ | −0.9390 |
| $C_{11}$ | 0.4345 |
| $C_{12}$ | 0.4433 |
| $C_{13}$ | −0.3076 |
| $C_{14}$ | 0.5644 |
| $C_{15}$ | 0.2571 |
| $C_{16}$ | −1.0030 |
| $C_{17}$ | −0.7820 |
| $C_{18}$ | −0.4064 |
| $C_{19}$ | 0.9034 |
| $C_{20}$ | 1.5406 |
| $C_{21}$ | −1.4613 |
| $C_{22}$ | 1.2745 |
| $C_{23}$ | 0.3715 |
| $C_{24}$ | 1.8134 |
| $C_{25}$ | 0.9438 |
| $C_{26}$ | 1.3130 |
| $C_{27}$ | −1.3070 |
| $C_{28}$ | −1.3462 |
| $C_{29}$ | 1.6868 |
| $C_{30}$ | −1.2153 |
| $C_{31}$ | −0.6778 |
| $C_{32}$ | −1.2385 |
| $C_{33}$ | −0.7883 |
| $C_{34}$ | −0.7954 |
| $C_{35}$ | 1.0874 |
| $C_{36}$ | 1.1491 |
| $C_{37}$ | −1.4780 |
| $C_{38}$ | 0.8870 |
| $C_{39}$ | 0.4694 |
| $C_{40}$ | 1.5066 |
| $C_{41}$ | 1.1266 |
| $C_{42}$ | 0.9935 |
| $C_{43}$ | −1.2462 |
| $C_{44}$ | −1.7869 |
| $C_{45}$ | 1.7462 |
| $C_{46}$ | −1.4881 |
| $C_{47}$ | −0.4090 |
| $C_{48}$ | −1.4694 |
| $C_{49}$ | −0.7923 |
| $C_{50}$ | −1.4607 |

-continued

| Sequence Element | Value |
|---|---|
| $C_{51}$ | −0.9113 |
| $C_{52}$ | 0.8454 |
| $C_{53}$ | −0.8866 |
| $C_{54}$ | 0.8852 |
| $C_{55}$ | 0.4918 |
| $C_{56}$ | −0.6096 |
| $C_{57}$ | −0.4321 |
| $C_{58}$ | −0.1327 |
| $C_{59}$ | 0.4953 |
| $C_{60}$ | 0.9702 |
| $C_{61}$ | −0.8667 |
| $C_{62}$ | 0.6803 |
| $C_{63}$ | −0.0244 |
| $C_{64}$ | 1.3095 |
| $C_{65}$ | 0.6675 |
| $C_{66}$ | 1.2587 |
| $C_{67}$ | −0.9993 |
| $C_{68}$ | −1.0052 |
| $C_{69}$ | 0.6601 |
| $C_{70}$ | −1.0228 |
| $C_{71}$ | −0.7489 |
| $C_{72}$ | 0.5086 |
| $C_{73}$ | 0.1563 |
| $C_{74}$ | 0.0673 |
| $C_{75}$ | −0.8375 |
| $C_{76}$ | −1.0746 |
| $C_{77}$ | 0.4454 |
| $C_{78}$ | −0.7831 |
| $C_{79}$ | −0.3623 |
| $C_{80}$ | −1.3658 |
| $C_{81}$ | −1.0854 |
| $C_{82}$ | −1.4923 |
| $C_{83}$ | 0.4233 |
| $C_{84}$ | 0.6741 |
| $C_{85}$ | −1.0157 |
| $C_{86}$ | 0.8304 |
| $C_{87}$ | 0.4878 |
| $C_{88}$ | −1.4992 |
| $C_{89}$ | −1.1884 |
| $C_{90}$ | −1.4008 |
| $C_{91}$ | 0.7795 |
| $C_{92}$ | 1.2926 |
| $C_{93}$ | −1.2049 |
| $C_{94}$ | 1.2934 |
| $C_{95}$ | 0.8123 |
| $C_{96}$ | −1.0094 |
| $C_{97}$ | −0.7598 |
| $C_{98}$ | −1.0786 |
| $C_{99}$ | 0.6699 |
| $C_{100}$ | 0.9813 |
| $C_{101}$ | −0.5563 |
| $C_{102}$ | 1.0548 |
| $C_{103}$ | 0.8925 |
| $C_{104}$ | −1.3656 |
| $C_{105}$ | −0.8472 |
| $C_{106}$ | −1.3110 |
| $C_{107}$ | 1.1897 |
| $C_{108}$ | 1.5127 |
| $C_{109}$ | −0.7474 |
| $C_{110}$ | 1.4678 |
| $C_{111}$ | 1.0295 |
| $C_{112}$ | −0.9210 |
| $C_{113}$ | −0.4784 |
| $C_{114}$ | −0.5022 |
| $C_{115}$ | 1.2153 |
| $C_{116}$ | 1.5783 |
| $C_{117}$ | −0.7718 |
| $C_{118}$ | 1.2384 |
| $C_{119}$ | 0.6695 |
| $C_{120}$ | 0.8821 |
| $C_{121}$ | 0.7807 |
| $C_{122}$ | 1.0537 |
| $C_{123}$ | −0.0791 |
| $C_{124}$ | −0.2845 |

-continued

| Sequence Element | Value |
| --- | --- |
| $C_{125}$ | 0.5790 |
| $C_{126}$ | −0.4664 |
| $C_{127}$ | −0.1097. |

35. The transceiver of claim 29, wherein the transformed preamble is stored in a memory prior to transmission.

36. A transceiver for a wireless communications system comprising:
- a transmitter comprising preamble transmission circuitry, a preamble comprising a sequence wherein the sequence comprises a concatenation of a first set of sub-sequences, with each sub-sequence containing a specified number of zeroes, and wherein each sub-sequence can differ depending upon its position in the preamble;
- a memory for storing a program;
- a processor for executing the program stored in the memory; and
- the program for transforming the preamble prior to transmission, the program including
  - instructions for a first domain conversion;
  - instructions for processing the domain converted preamble; and
  - instructions for a second domain conversion, wherein the processing comprises magnitude clipping, and wherein the time domain sequence after the second domain conversion is specified as follows:

| Sequence Element | Value |
| --- | --- |
| $C_0$ | 0.6564 |
| $C_1$ | −1.3671 |
| $C_2$ | −0.9958 |
| $C_3$ | −1.3981 |
| $C_4$ | 0.8481 |
| $C_5$ | 1.0892 |
| $C_6$ | −0.8621 |
| $C_7$ | 1.1512 |
| $C_8$ | 0.9602 |
| $C_9$ | −1.3581 |
| $C_{10}$ | −0.8354 |
| $C_{11}$ | −1.3249 |
| $C_{12}$ | 1.0964 |
| $C_{13}$ | 1.3334 |
| $C_{14}$ | −0.7378 |
| $C_{15}$ | 1.3565 |
| $C_{16}$ | 0.9361 |
| $C_{17}$ | −0.8212 |
| $C_{18}$ | −0.2662 |
| $C_{19}$ | −0.6866 |
| $C_{20}$ | 0.8437 |
| $C_{21}$ | 1.1237 |
| $C_{22}$ | −0.3265 |
| $C_{23}$ | 1.0511 |
| $C_{24}$ | 0.7927 |
| $C_{25}$ | −0.3363 |
| $C_{26}$ | −0.1342 |
| $C_{27}$ | −0.1546 |
| $C_{28}$ | 0.6955 |
| $C_{29}$ | 1.0608 |
| $C_{30}$ | −0.1600 |
| $C_{31}$ | 0.9442 |
| $C_{32}$ | −0.0844 |
| $C_{33}$ | 1.1974 |
| $C_{34}$ | 1.2261 |
| $C_{35}$ | 1.4401 |
| $C_{36}$ | −0.5988 |

-continued

| Sequence Element | Value |
| --- | --- |
| $C_{37}$ | −0.4675 |
| $C_{38}$ | 0.8520 |
| $C_{39}$ | −0.8922 |
| $C_{40}$ | −0.5603 |
| $C_{41}$ | 1.1886 |
| $C_{42}$ | 1.1128 |
| $C_{43}$ | 1.0833 |
| $C_{44}$ | −0.9073 |
| $C_{45}$ | −1.6227 |
| $C_{46}$ | 1.0013 |
| $C_{47}$ | −1.6067 |
| $C_{48}$ | 0.3360 |
| $C_{49}$ | −1.3136 |
| $C_{50}$ | −1.4448 |
| $C_{51}$ | −1.7238 |
| $C_{52}$ | 1.0287 |
| $C_{53}$ | 0.6100 |
| $C_{54}$ | −0.9237 |
| $C_{55}$ | 1.2618 |
| $C_{56}$ | 0.5974 |
| $C_{57}$ | −1.0976 |
| $C_{58}$ | −0.9776 |
| $C_{59}$ | −0.9982 |
| $C_{60}$ | 0.8967 |
| $C_{61}$ | 1.7640 |
| $C_{62}$ | −1.0211 |
| $C_{63}$ | 1.6913 |
| $C_{64}$ | −0.2095 |
| $C_{65}$ | 1.1640 |
| $C_{66}$ | 1.2334 |
| $C_{67}$ | 1.5338 |
| $C_{68}$ | −0.8844 |
| $C_{69}$ | −0.3857 |
| $C_{70}$ | 0.7730 |
| $C_{71}$ | −0.9754 |
| $C_{72}$ | −0.2315 |
| $C_{73}$ | 0.5579 |
| $C_{74}$ | 0.4035 |
| $C_{75}$ | 0.4248 |
| $C_{76}$ | −0.3359 |
| $C_{77}$ | −0.9914 |
| $C_{78}$ | 0.5975 |
| $C_{79}$ | −0.8408 |
| $C_{80}$ | 0.3587 |
| $C_{81}$ | −0.9604 |
| $C_{82}$ | −1.0002 |
| $C_{83}$ | −1.1636 |
| $C_{84}$ | 0.9590 |
| $C_{85}$ | 0.7137 |
| $C_{86}$ | −0.6776 |
| $C_{87}$ | 0.9824 |
| $C_{88}$ | −0.5454 |
| $C_{89}$ | 1.1022 |
| $C_{90}$ | 1.6485 |
| $C_{91}$ | 1.3307 |
| $C_{92}$ | −1.2852 |
| $C_{93}$ | −1.2659 |
| $C_{94}$ | 0.9435 |
| $C_{95}$ | −1.6809 |
| $C_{96}$ | 0.4232 |
| $C_{97}$ | −1.2684 |
| $C_{98}$ | −1.8151 |
| $C_{99}$ | −1.4829 |
| $C_{100}$ | 1.0302 |
| $C_{101}$ | 0.9419 |
| $C_{102}$ | −1.1472 |
| $C_{103}$ | 1.4858 |
| $C_{104}$ | −0.6794 |
| $C_{105}$ | 0.9573 |
| $C_{106}$ | 1.0807 |
| $C_{107}$ | 1.1445 |
| $C_{108}$ | −1.2312 |
| $C_{109}$ | −0.6643 |
| $C_{110}$ | 0.3836 |
| $C_{111}$ | −1.1482 |
| $C_{112}$ | −0.0353 |

-continued

| Sequence Element | Value |
| --- | --- |
| $C_{113}$ | −0.6747 |
| $C_{114}$ | −1.1653 |
| $C_{115}$ | −0.8896 |
| $C_{116}$ | 0.2414 |
| $C_{117}$ | 0.1160 |
| $C_{118}$ | −0.6987 |
| $C_{119}$ | 0.4781 |
| $C_{120}$ | 0.1821 |
| $C_{121}$ | −1.0672 |

-continued

| Sequence Element | Value |
| --- | --- |
| $C_{122}$ | −0.9676 |
| $C_{123}$ | −1.2321 |
| $C_{124}$ | 0.5003 |
| $C_{125}$ | 0.7419 |
| $C_{126}$ | −0.8934 |
| $C_{127}$ | 0.8391. |

* * * * *

UNITED STATES PATENT AND TRADEMARK OFFICE
CERTIFICATE OF CORRECTION

PATENT NO. : 7,634,020 B2
APPLICATION NO. : 10/782095
DATED : December 15, 2009
INVENTOR(S) : Batra et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1532 days.

Signed and Sealed this

Ninth Day of November, 2010

David J. Kappos
*Director of the United States Patent and Trademark Office*